(12) United States Patent
Ligameri et al.

(10) Patent No.: US 10,249,089 B2
(45) Date of Patent: Apr. 2, 2019

(54) SYSTEM AND METHOD FOR REPRESENTING REMOTE PARTICIPANTS TO A MEETING

(71) Applicant: Dell Products, LP, Round Rock, TX (US)

(72) Inventors: Mark R. Ligameri, Santa Rosa, FL (US); Michiel Knoppert, Amsterdam (NL); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/225,650

(22) Filed: Aug. 1, 2016

(65) Prior Publication Data

US 2018/0033203 A1 Feb. 1, 2018

(51) Int. Cl.
*G06T 19/00* (2011.01)
*G06F 3/14* (2006.01)
(Continued)

(52) U.S. Cl.
CPC ........ *G06T 19/006* (2013.01); *G06F 3/04845* (2013.01); *G06F 3/1454* (2013.01); *G06T 15/20* (2013.01); *H04L 12/1813* (2013.01)

(58) Field of Classification Search
CPC .... G06T 19/006; H04N 7/157; H04L 12/1813
See application file for complete search history.

(56) References Cited

U.S. PATENT DOCUMENTS

| 5,999,208 A | 12/1999 | McNerney |
| 6,057,856 A | 5/2000 | Miyashita |

(Continued)

OTHER PUBLICATIONS

Video titled "3D-Board: A Whole-body Remote Collaborative Whiteboard" dated Sep. 27, 2014, publicly available for view at: https://www.youtube.com/watch?v=2D5JeNeq3Kg; select screen shots included.*

*Primary Examiner* — Daniel F Hajnik
(74) *Attorney, Agent, or Firm* — Prol Intellectual Property Law, PLLC; H. Kenneth Prol

(57) ABSTRACT

An information handling system operating an augmented presentation management system may include a processor receiving a first three-dimensional image of a first presenter including data of a presenter location relative to a presenter digital display device captured via a three-dimensional camera, the processor receiving data describing the position and display characteristics of a virtual, shared presentation graphical display element similar to a presentation graphical display element displayed on a presenter screen, and the processor executing code instructions of the augmented presentation management system to instruct a digital display device to display the first three-dimensional image of the first presenter interacting with a displayed virtual, shared presentation graphical display element, wherein the augmented presentation management system instructs the digital display device to display the virtual, shared presentation graphical display element such that both the first three-dimensional image of the first presenter and the virtual shared presentation graphical display element on the digital display device are both viewable in three dimensional perspective correlating to the location of the first presenter to the presenter digital display device.

20 Claims, 12 Drawing Sheets

(51) Int. Cl.
*G06T 15/20* (2011.01)
*H04L 12/18* (2006.01)
*G06F 3/0484* (2013.01)

(56) References Cited

U.S. PATENT DOCUMENTS

| | | | |
|---|---|---|---|
| 6,085,256 A | 7/2000 | Kitano | |
| 2013/0044128 A1 | 2/2013 | Liu | |
| 2013/0050398 A1* | 2/2013 | Krans | H04N 7/142 |
| | | | 348/14.07 |
| 2013/0117377 A1 | 5/2013 | Miller | |
| 2014/0232816 A1* | 8/2014 | Wilson | H04N 7/157 |
| | | | 348/14.08 |
| 2015/0244976 A1* | 8/2015 | Chen | H04N 7/141 |
| | | | 348/14.07 |
| 2017/0339372 A1* | 11/2017 | Valli | H04N 7/157 |

* cited by examiner

SYSTEM AND METHOD FOR REPRESENTING REMOTE PARTICIPANTS TO A MEETING

FIELD OF THE DISCLOSURE

The present disclosure generally relates to information handling systems, and more particularly relates to a system and method of representing multiple participants to a meeting and sharing virtual content.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
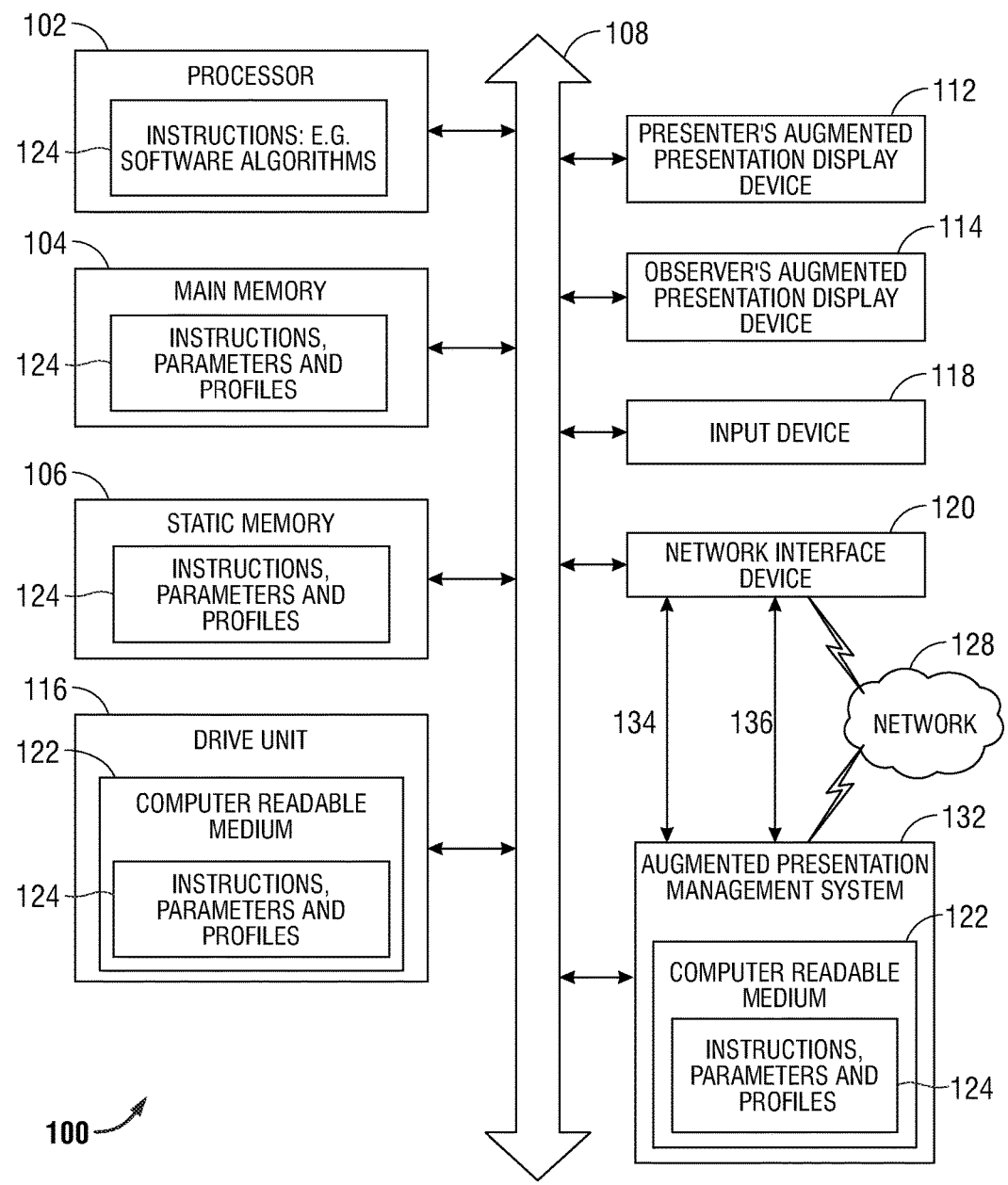
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Multiple display devices may be used, at multiple geographic locations, to record images of presenters presenting graphical information and to display those images to remote observers, along with the graphical information. A system is needed to coordinate the images of the presenters, as they interact with the graphical information displayed at their geographical location with the display of the same graphical information displayed at a remote observer's separate geographical location. Further, a system is needed to coordinate the display and movement of the graphical information displayed at the remote observer's digital display with the presenter's manipulation of that same graphical information, as displayed at the presenter's digital display.

In the present disclosure, an augmented presentation management system is established to generate a presentation whereby an observer and one or more remote participants having a different geographic location may participate as if they were all in the same room together. In one example embodiment, in augmented presentation management system may be used to display a presentation to a remote observer, in which the remote observer's display includes an image of the presenter along with presentation graphical display elements that are visible to the presenter. In an embodiment, the augmented presentation system may include a first augmented presentation display device at the same geographic location as the presenter, and a second augmented presentation display device at the same geographic location as the observer. In another embodiment, the system may also include a third augmented presentation display device at the same geographic location as a second presenter having a different geographic location from either the first presenter or the observer. In another aspect, each augmented presentation display device may include a three-dimensional camera to capture images of each participant, a digital display, an augmented presentation display network interface device, and a command input detection device.

In an embodiment, the augmented presentation management system may include several modules, including, but not limited to, a three-dimensional mapping module, a primitive merger module, an augmented presentation display module, an input command recognition module, and a presentation graphical display element manipulation module. The augmented presentation management system in an embodiment may receive three-dimensional images of each participant and objects surrounding each participant, as captured by the three-dimensional camera array on each participant's augmented presentation display device. In another aspect, the augmented presentation management system may generate a virtual three-dimensional environment based on each captured three-dimensional image that includes primitives of each participant, objects surrounding each participant, and a virtual user interface plane. The augmented presentation management system in a further aspect may merge all virtual three-dimensional environments into a single merged three-dimensional environment such that the virtual user interface planes in each virtual three-dimensional environment share the same coordinates in the merged virtual three-dimensional environment.

In another aspect, the augmented presentation management system may generate virtual, shared presentation graphical display element primitives within the shared virtual user interface plane, located such that both the presenter and the virtual, shared presentation graphical display element primitives can be viewed from the perspective of the observer's primitive in the virtual three-dimensional environment. The augmented presentation management system, in another aspect, may display the virtual, shared presentation graphical display elements on each user's digital display in the same location as the virtual, shared presentation graphical display element's primitive with respect to the virtual user interface plane, and may also display the three-dimensional image of the presenter on the observer's digital display in the same location as the presenter's primitive with respect to the virtual user interface plane. It is understood the displayed three-dimensional image may include but not be limited to a display of the three-dimensional image of a participant, as captured by the three-dimensional camera array, or may be represented by an avatar representation of the participant. In another embodiment, the augmented presentation display device may further display the three-dimensional image of a second presenter on a first presenter's digital display in the same location as the second presenter's primitive with respect to the virtual user interface plane, or vice versa.

In another aspect, the augmented presentation management system may receive a second three-dimensional image of a presenter, taken at a later instance in time. The augmented presentation management system in that scenario may determine whether the presenter's location has changed between the first three-dimensional image and the second three-dimensional image, taken at a later instance in time. If the presenter's location has changed, the augmented presentation management system in an embodiment may re-render the presenter and the virtual, shared presentation graphical display element primitives such that both the re-rendered presenter primitive and the virtual, shared presentation graphical display element primitive can be viewed from the perspective of the observer's primitive in the virtual three-dimensional environment. In yet another aspect, the augmented presentation management system may detect an input command from a presenter to manipulate a presentation graphical display element and associate that command with computer software instructions to manipulate a primitive of the virtual, shared presentation graphical display element associated with that presentation graphical display element.

In one embodiment, the augmented presentation management system is software code executable on one or more application processors, which may reside at the local digital display device, the remote digital display device, the remote presenter's digital display device, or at one or more remote servers and data base systems. In other embodiments, some or all of the augmented presentation management system may include firmware executed via processors or controller or may be hardcoded as an applied specific integrated circuit (ASIC) or other circuit to execute some or all of the operations described in the disclosure herein.

Examples are set forth below with respect to particular aspects of an information handling system for merging images of one or more presenters and presentation graphical display elements across multiple display devices to create an augmented multiple display presentation.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device, a head-mounted display device, or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a Systemon-a-Chip (SoC), or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code 124 for an augmented presentation management system that may operate on servers or systems, remote data centers, or on-box in individual client information handling systems such as a local display device, remote display device, or remote presenter's display device computing system according to various embodiments herein. In some embodiments, it is understood any or all portions of code 124 for an augmented presentation management system may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a presenter's augmented presentation display device 112, and an observer's augmented presentation display device 114. The information handling system 100 may further include any number of additional presenter's augmented presentation display devices (not shown) and/or additional observer's augmented presentation display devices (not shown). For example, the information handling system 100 may include a presenter's augmented presentation display device 112, an observer's augmented presentation display device 114, and a second presenter's augmented presentation display device (not shown) where the second presenter has a different geographic location than the presenter. Each of these display devices may function as a liquid crystal display (LCD), an organic light emitting diode (OLED), a flat panel display, a solid state display, or a cathode ray tube (CRT). Further, each of these display devices may operate as a head-mounted display device to generate an augmented reality display. A head mounted display device may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display device may use any method that reflects projected images in order to create an augmented reality.

Additionally, the information handling system 100 may include an input device 118, such as a keyboard, and a cursor user input device, such as a mouse, touchpad, or gesture or touch screen input. Input devices may further include a stylus, a pen, or a wearable electronic pointing device that may have a transmitter for indicating a position in relation to another information handling system or digital display screen. In other aspects, an input device 118 may be detected by an information handling system such as by a proximity sensor, three-dimensional camera, or touch screen. The augmented presentation display devices may display presentation graphical display elements users may manipulate in order to affect communication between the local presenter and/or the remote presenter and the remote observer. The presenter in an embodiment may affect manipulation of the presentation graphical display elements using an input device 118.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 116 or in a storage system (not illustrated) associated with network interface device 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In an example of the present disclosure, instructions 124 may execute the augmented presentation management system 132 as disclosed herein, and an API may enable interaction between the application program and device drivers and other aspects of the information handling system and software instructions 124 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory, storage devices and an augmented presentation management system 104, 106, 116, and 132 may store one or more sets of instructions 124 such as software code corresponding to the present disclosure.

The disk drive unit 116, and static memory 106, also contains space for data storage such as an information handling system for augmented presentations. Data including but not limited to data regarding a three-dimensional image of a presenter and a non-presenter object, as captured by the presenter's three-dimensional camera array, a three-dimensional image of an observer and a non-observer object, as captured by the observer's three-dimensional camera array, a three-dimensional image of a second presenter and a second non-presenter object, as captured by a second presenter's three-dimensional camera array, data describing the identification of the participant and/or non participant object within the three-dimensional image, as determined by the object identification module, any second three-dimensional images of participants taken at a second instance in time, data describing the identification of the participant within the second three-dimensional image taken at a second instance in time, as determined by the object identification module, a participant's virtual three-dimensional environment based upon a first three-dimensional image taken at a first instance in time, a presenter's virtual three-dimensional environment which may include a primitive of a presenter, a second presenter and a primitive of a presenter's virtual user interface plane, an observer's virtual three-dimensional environment which may include a primitive of an observer and a primitive of an observer's virtual user interface plane, a second presenter's virtual three-dimensional environment which may include a primitive of a second presenter and a primitive of a second presenter's virtual user interface plane, a second three-dimensional image of any participant, captured by that participant's three-dimensional camera array at a second instance in time, and each participant's virtual, three-dimensional environment, as generated by the augmented presentation management system's three-dimensional mapping module, the merged, virtual three-dimensional environment, a three-dimensional location of a virtual shared presentation graphical display element's primitive within a merged virtual three-dimensional environment, a three-dimensional image of one or more participants, a three-dimensional location of one or more participant's primitives within a merged virtual three-dimensional environment, an input command in the form of keyboard entry, mouse entry, voice command, gesture command, or touch screen entry given in order to affect manipulation of a presentation graphical display element, software instructions regarding manipulation of the virtual shared presentation graphical display element, as commanded, and data regarding the detection of an input command to manipulate a presentation graphical display element may also be stored in part or in full in data storage 106 or 116. Further, the instructions 124 may embody one or more of the methods or logic as described herein. For example, instructions relating to the hardware implementation of the head mounted display device 130 or subcomponents, or the augmented presentation management system 132 software algorithms may be stored here.

In a particular embodiment, the instructions, parameters, and profiles 124 may reside completely, or at least partially, within the main memory 104, the static memory 106, disk drive 116 and/or within the processor 102 during execution by the information handling system 100. Software applications may be stored in static memory 106 or disk drive 116.

Network interface device 120 represents a NIC disposed within information handling system 100, on a main circuit board of the information handling system, integrated onto another component such as processor 102, in another suitable location, or a combination thereof. Network interface device 120 includes network channels 134 and 136 that provide interfaces to devices that are external to information handling system 100. In a particular embodiment, network channels 134 and 136 are of a different type than memory bus 108 and network interface device 120 translates information from a format suitable to the memory bus 108 to a format suitable to external devices. An example of network channels 134 and 136 includes InfiniBand channels, Fiber Channel channels, Gigabit Ethernet channels, proprietary channel architectures, or a combination thereof. The network interface device 120 can include another information handling system, a data storage system, another network, a grid management system, another suitable resource, or a combination thereof.

Network channels 134 and 136 can be connected to external network resources, and may be connected directly to an augmented presentation management system 132, or indirectly through network interface device 120 to drive unit 116, both of which can also contain computer readable medium 122. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include an augmented presentation management system 132 that may be operably connected to the bus 108, may connect to the bus indirectly through the network 128 and the network interface device 120, or may connect directly to the network interface device 120 via the network channels 134 and 136. The augmented presentation management system 132 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the augmented presentation management system 132 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
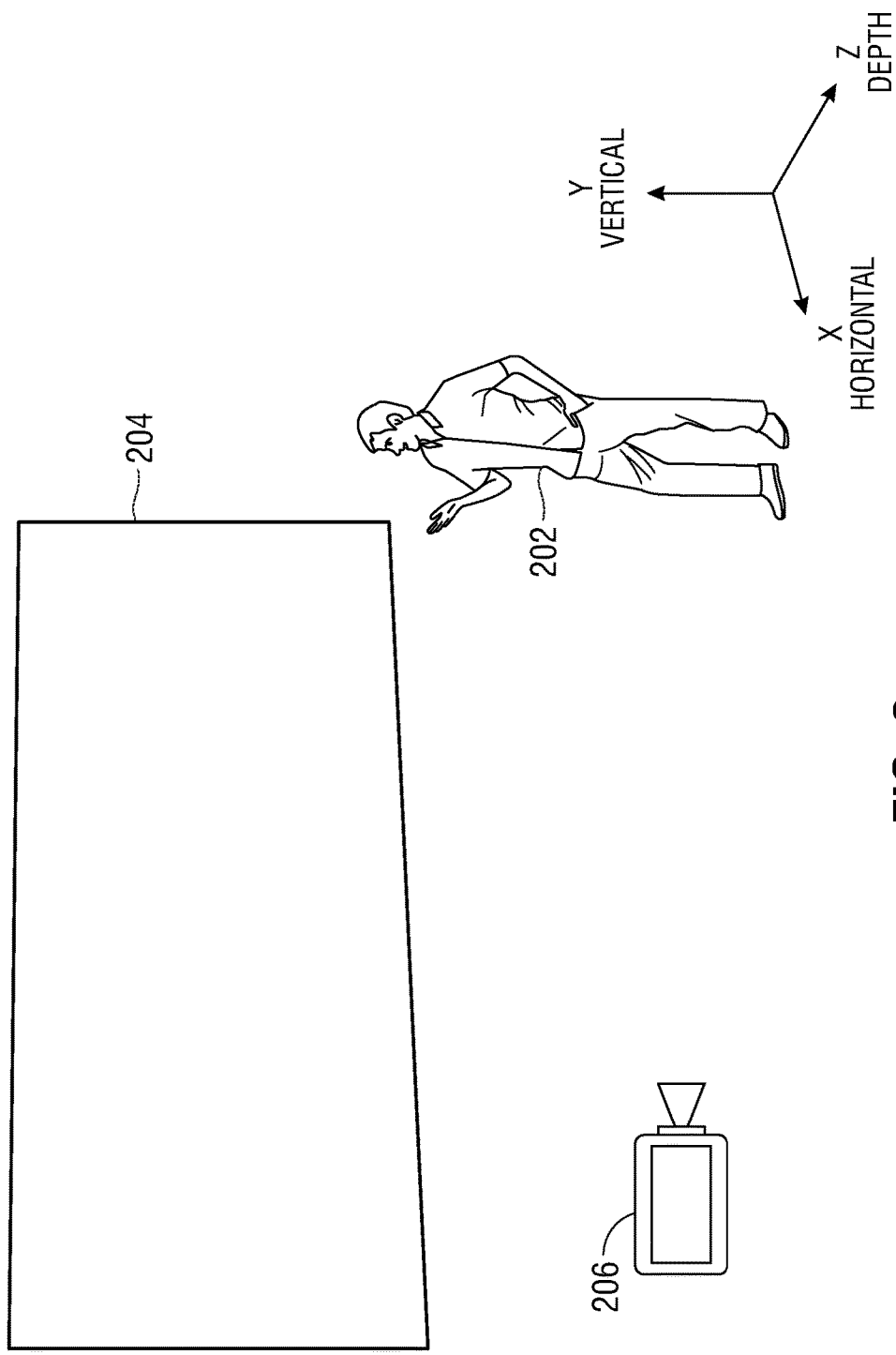
FIG. 2 is a graphical depiction of a participant giving a presentation of shared virtual presentation content according to an embodiment of the present disclosure.

FIG. 2 is a depiction of a participant in a presentation, a three-dimensional camera, and a non-participant object together in one geographic location. As shown in FIG. 2, a participant 202 may be in the same geographic location as a non-participant object 204 and a three-dimensional camera array 206. The three-dimensional camera array 206 may capture a three-dimensional image of a participant 202 of a presentation, and a non-participant object 204. A non-participant object 204 may be any object in the room with the participant 202, other than the participant 202 himself, that may be captured in the three-dimensional image. For example, the non-participant object 204 may be a digital display device, such as a television or computer monitor, or could be completely unrelated to display, such as a piece of furniture. The participant in an embodiment may be a presenter, or an observer, and there may be any number of presenters or observers. For example, the participant 202 in an embodiment, as shown in FIG. 2 may be a presenter, an observer, or a second presenter. In an embodiment, a presenter may have a geographic location separate from or the same as the observer. In a further embodiment, a second presenter may have a geographic location separate from or the same as the presenter.

Figure 3:
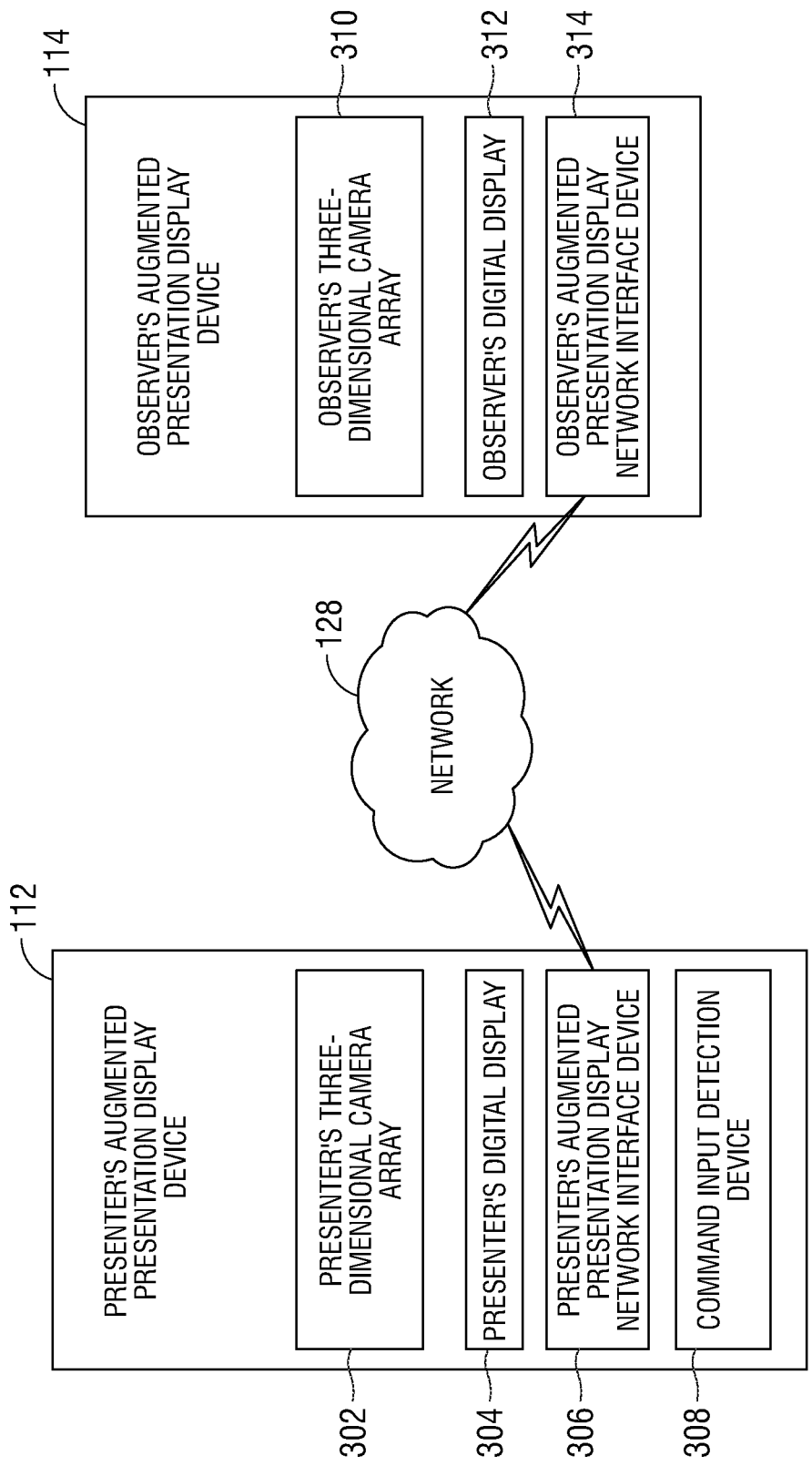
FIG. 3 is a block diagram illustrating augmented presentation display devices according to an embodiment of the present disclosure.

FIG. 3 is a block diagram illustrating a presenter's augmented presentation display device and an observer's augmented presentation display device according to an embodiment of the present disclosure. In an embodiment, a presenter's augmented presentation display device 112 may be an information handling system, located in the same geographical location as the presenter of the presentation. The presenter's augmented presentation display device 112 in an embodiment may capture a three-dimensional image of a presenter, and may simultaneously display presentation graphical display elements to aid in the presentation of information. As shown in FIG. 3, the presenter's augmented presentation display device 112 may include a presenter's three-dimensional camera array 302, a presenter's digital display 304, a presenter's augmented presentation display device network interface device 306, and a command input detection device 308 to detect the presenter's voice commands. As discussed in the present disclosure, the presenter's augmented presentation display device 112 may be operatively connected to a bus (not shown), or may connect to the bus indirectly by connecting with the network 128 or connecting to the network interface device via network channels (not shown).

In an embodiment, it is understood that the presenter's three-dimensional camera array 302, as shown in FIG. 3, may include a three-dimensional (3-D) camera, e.g., a stereo triangulation camera, a sheet of light triangulation camera, a structured light camera, a time-of-flight camera, an interferometry camera, a coded aperture camera, or any other type of 3-D camera. It is also understood that the presenter's digital display 304, in an embodiment and as shown in FIG. 3, may include a liquid crystal display (LCD), an organic light emitting diode (OLED), a flat panel display, a solid state display, or a cathode ray tube (CRT). Further, it is understood the presenter's digital display 304 may operate as a head-mounted display device to generate an augmented reality display. A head mounted display device may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display device may use any method that reflects projected images in order to create an augmented reality. The presenter's augmented presentation display device 112 in an embodiment can also include a presenter's augmented presentation display device network interface device 306 that may be a wired network adapter or may be a wireless adapter as shown. As a wireless adapter, the presenter's augmented presentation display device network interface device 306 can provide connectivity to the network 128 in an embodiment. A wired network interface connected both directly into the bus and indirectly through network channels and a network interface device are also contemplated (not shown). As also shown in FIG. 3, the presenter's augmented presentation display device 112 in an embodiment may further include a command input detection device 308. The command input detection device 308 in an embodiment may be capable of detecting commands received via an input device. For example, with reference to the embodiment described in FIG. 1, the information handling system 100 may include an input device 118.

In an embodiment, an observer's augmented presentation display device 114 may be an information handling system, located in the same geographical location as the observer of the presentation. The observer's augmented presentation display device 114 in an embodiment may capture a three-dimensional image of an observer, and may simultaneously display presentation graphical display elements to aid in the presentation of information. As shown in FIG. 3, the observer's augmented presentation display device 114 may include an observer's three-dimensional camera array 310, an observer's digital display 312, and an observer's augmented presentation display device network interface device 314. As discussed in the present disclosure, the observer's augmented presentation display device 114 may be operatively connected to a bus (not shown), or may connect to the bus indirectly by connecting with the network 128 or connecting to the network interface device via network channels (not shown).

In an embodiment, it is understood that the observer's three-dimensional camera array 302, as shown in FIG. 3, may include a three-dimensional (3-D) camera, e.g., a stereo triangulation camera, a sheet of light triangulation camera, a structured light camera, a time-of-flight camera, an interferometry camera, a coded aperture camera, or any other type of 3-D camera. It is also understood that the observer's digital display 312, in an embodiment and as shown in FIG. 3, may include a liquid crystal display (LCD), an organic light emitting diode (OLED), a flat panel display, a solid state display, or a cathode ray tube (CRT). Further, it is understood the observer's digital display 312 may operate as a head-mounted display device to generate an augmented reality display. A head mounted display device may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display device may use any method that reflects projected images in order to create an augmented reality. The observer's augmented presentation display device 114 in an embodiment can also include an observer's augmented presentation display device network interface device 314 that may be a wired network adapter or may be a wireless adapter as shown. As a wireless adapter, the observer's augmented presentation display device network interface device 314 can provide connectivity to the network 128 in an embodiment. A wired network interface connected both directly into the bus and indirectly through network channels and a network interface device are also contemplated (not shown).

As discussed with reference to the embodiment described in FIG. 1, the information handling system 100 may further include any number of additional presenter's augmented presentation display devices (not shown) and/or additional observer's augmented presentation display devices (not shown). For example, the information handling system 100 may include a presenter's augmented presentation display device 112, an observer's augmented presentation display device 114, and a second presenter's augmented presentation display device (not shown) where the second presenter has a different geographic location than the presenter. In a scenario involving more than one presenter's augmented presentation display device, each presenter's augmented presentation display device may have the same structure and functionality as described with reference to the presenter's augmented presentation display device 112 in FIG. 3. Similarly, in a scenario involving more than one observer's augmented presentation display device, each observer's augmented presentation display device may have the same structure and functionality as described with reference to the observer's augmented presentation display device 114 in FIG. 3.

Figure 4:
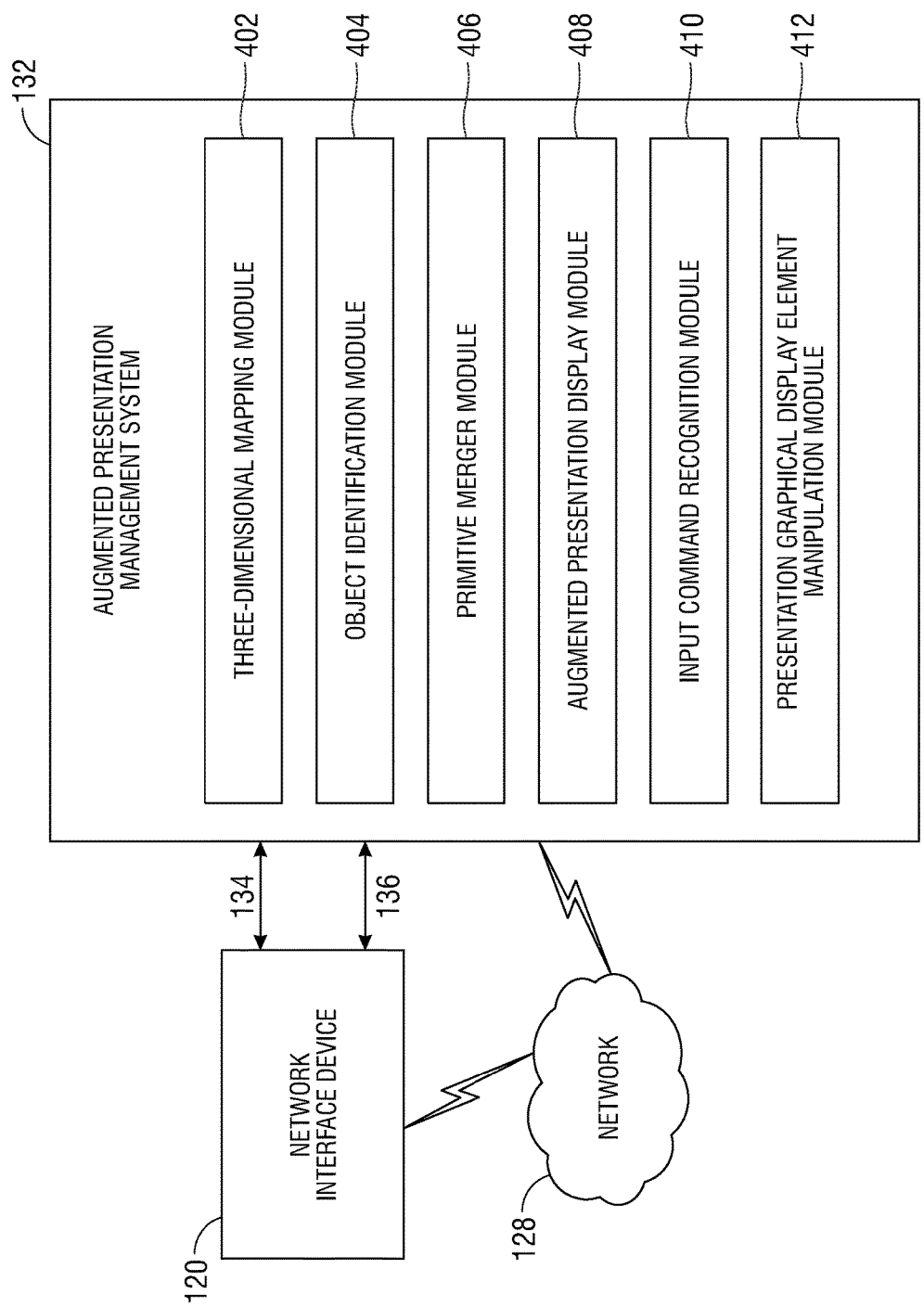
FIG. 4 is a block diagram illustrating an augmented presentation management system operable to project presentations to one or more display devices according to an embodiment of the present disclosure.

FIG. 4 is a block diagram illustrating an augmented presentation management system according to an embodiment of the present disclosure. The information handling system can include devices or modules that embody the augmented presentation management system 132, and the information handling system may execute code for an augmented presentation management system 132 that may operate on servers or systems, remote data centers, or on-box in individual client information handling systems according to various embodiments herein. In an example of the present disclosure, code instructions may execute the augmented presentation management system 132 as disclosed herein, and an API may enable interaction between the application program and device drivers and other aspects of the information handling system and software instructions thereon. The augmented presentation management system 132 can also be configured as hardware as described above. For example, a portion of the augmented presentation management system 132 may be hardware such as, for example, an integrated circuit (such as an Application Specific Integrated Circuit (ASIC), a Field Programmable Gate Array (FPGA), a structured ASIC, or a device embedded on a larger chip), a card, or a system (such as a motherboard, a system-on-a-chip (SoC), or a stand-alone device). The augmented presentation management system 132 can also have some or all parts to include software, including firmware embedded at a device, capable of operating a relevant environment of the information handling system. The augmented presentation management system 132 can also include a combination of the foregoing examples of hardware or software.

As shown in FIG. 4, the augmented presentation management system 132 may connect to a bus of an information handling system indirectly through the network 128 and the network interface device 120, or may connect directly to the network interface device 120 via the network channels 134 and 136. The augmented presentation management system 132 may also connect directly to the bus of the information handling system.

As shown in FIG. 4, the augmented presentation management system 132 in an embodiment may include a three-dimensional mapping module 402, an object identification module 404, a primitive merger module 406, an augmented presentation display module 408, an input command recognition module 410, and a presentation graphical display element manipulation module 412. In an embodiment, the augmented presentation management system may access data regarding a three-dimensional image of a presenter and a non-presenter object, as captured by the presenter's three-dimensional camera array, a three-dimensional image of an observer and a non-observer object, as captured by the observer's three-dimensional camera array, a three-dimensional image of a second presenter and a second non-presenter object, as captured by a second presenter's three-dimensional camera array.

In an embodiment, the three-dimensional mapping module 402 may determine the three-dimensional location of a participant and/or a non-participant object in a three-dimensional image, render a virtual three-dimensional environment, including a three-dimensional primitive of a participant and/or a non-participant object, and to identify and/or render a virtual user interface plane within the virtual three-dimensional environment. The three-dimensional mapping module 402 in an embodiment may also operate to render a virtual, shared presentation graphical display element primitive within the virtual user interface plane in a merged virtual three-dimensional environment such that each presenters' primitives and the virtual, shared presentation graphical display element primitive may be viewed from the perspective of the observer's primitive. The three-dimensional mapping module 402 in an embodiment may repeat this functionality for each three-dimensional image of each participant received. In a further embodiment, the three-dimensional mapping module 402 may further operate to determine the three-dimensional location of a participant in a three-dimensional image captured at a later instance in time, determine whether the participant's location has changed, to re-render the virtual three-dimensional environment where the participant's primitive has the altered location identified in the three-dimensional image taken at a later instance in time, and to re-render the primitive of the virtual, shared presentation graphical display element within the virtual user interface plane of the merged virtual three-dimensional environment.

The three-dimensional mapping module 402 in an embodiment may access any three-dimensional image of a participant and non-participant object, and data describing the identification of the participant and/or non participant object within the three-dimensional image, as determined by the object identification module 404. The three-dimensional mapping module 402 in a further embodiment may also access any second three-dimensional images of participants taken at a second instance in time and data describing the identification of the participant within the second three-dimensional image taken at a second instance in time, as determined by the object identification module 404. The three-dimensional mapping module 402 in yet another embodiment may also access a participant's virtual three-dimensional environment based upon a first three-dimensional image taken at a first instance in time. It is understood that a series of three-dimensional images may be displayed for a participant and non-participant objects such that the movement of the three-dimensional image of a participant and non-participant object may operate as a video or an avatar substitute may track movements of the three-dimensional image of a participant or a non-participant object.

The object identification module 404 in an embodiment, as shown in FIG. 4, may operate to identify a participant and/or a non-participant object as captured in a three-dimensional image received from an augmented presentation digital display device. The primitive merger module 406 in an embodiment, as shown in FIG. 4, may operate to merge each virtual three-dimensional environment generated by the three-dimensional mapping module 402 into a single merged virtual three-dimensional environment such that the virtual user interface plane primitives in each individual virtual three-dimensional environment shares the same coordinates in the merged virtual three-dimensional environment, to create a single merged virtual user interface plane primitive. The object identification module 404 in an embodiment may access any captured three-dimensional image of a participant taken at a first instance in time. The object identification module 404 in a further embodiment may access any three-dimensional image of a participant captured at a second instance in time.

The Augmented Presentation Display Module 408 in an embodiment, as shown in FIG. 4, may operate to display a virtual, shared presentation graphical display element on each participants' digital display in the location of the virtual, shared presentation graphical display elements' primitive with respect to the merged virtual user interface plane primitive in the merged virtual three-dimensional environment. In an embodiment, the augmented presentation display module 408 may further operate to display a three-dimensional image of a presenter on the observer's digital display in the location of the presenter's primitive with respect to the merged virtual user interface plane primitive in the merged virtual three-dimensional environment. The augmented presentation management system in an embodiment may access one or more of the following: a presenter's virtual three-dimensional environment which may include a primitive of a presenter, a second presenter and a primitive of a presenter's virtual user interface plane, an observer's virtual three-dimensional environment which may include a primitive of an observer and a primitive of an observer's virtual user interface plane, and a second presenter's virtual three-dimensional environment which may include a primitive of a second presenter and a primitive of a second presenter's virtual user interface plane. The augmented presentation management system in a further embodiment may also access one or more of the following: a second three-dimensional image of any participant, captured by that participant's three-dimensional camera array at a second instance in time, and each participant's virtual, three-dimensional environment, as generated by the augmented presentation management system's three-dimensional mapping module 402. In a further embodiment, the augmented presentation management system may also access the merged, virtual three-dimensional environment, a three-dimensional location of a virtual shared presentation graphical display element's primitive within a merged virtual three-dimensional environment, a three-dimensional image of one or more participants, and a three-dimensional location of one or more participant's primitives within a merged virtual three-dimensional environment.

The Input Command Recognition Module 410 in an embodiment, as shown in FIG. 4, may operate to detect an input command from a presenter to manipulate a presentation graphical display element. In an embodiment, the input command recognition module 410 may access an input command in the form of keyboard entry, mouse entry, voice command, gesture command, or touch screen entry given in order to affect manipulation of a presentation graphical display element, and software instructions regarding manipulation of the virtual shared presentation graphical display element, as commanded. In another aspect, a user input device may be a stylus, pen, or wearable cursor control or other input device that may transmit location data with respect to a virtual, shared presentation. Intersection of the plane of operation of the user input device and the virtual, shared presentation may indicate execution of commands or input to the presentation application by one or more participants.

The presentation graphical display element manipulation module 412 in an embodiment, as shown in FIG. 4, may operate to associate an identified input command with a computer software instruction to manipulate a primitive of an associated virtual, shared presentation graphical display element. The presentation graphical display element manipulation module 412 in an embodiment may access data regarding the detection of an input command to manipulate a presentation graphical display element.

In an example of the present disclosure, code instructions may execute the augmented presentation management system 132 as disclosed herein, and an API may enable interaction between the application program and device drivers and other aspects of the information handling system and software instructions thereon.

Figure 5:
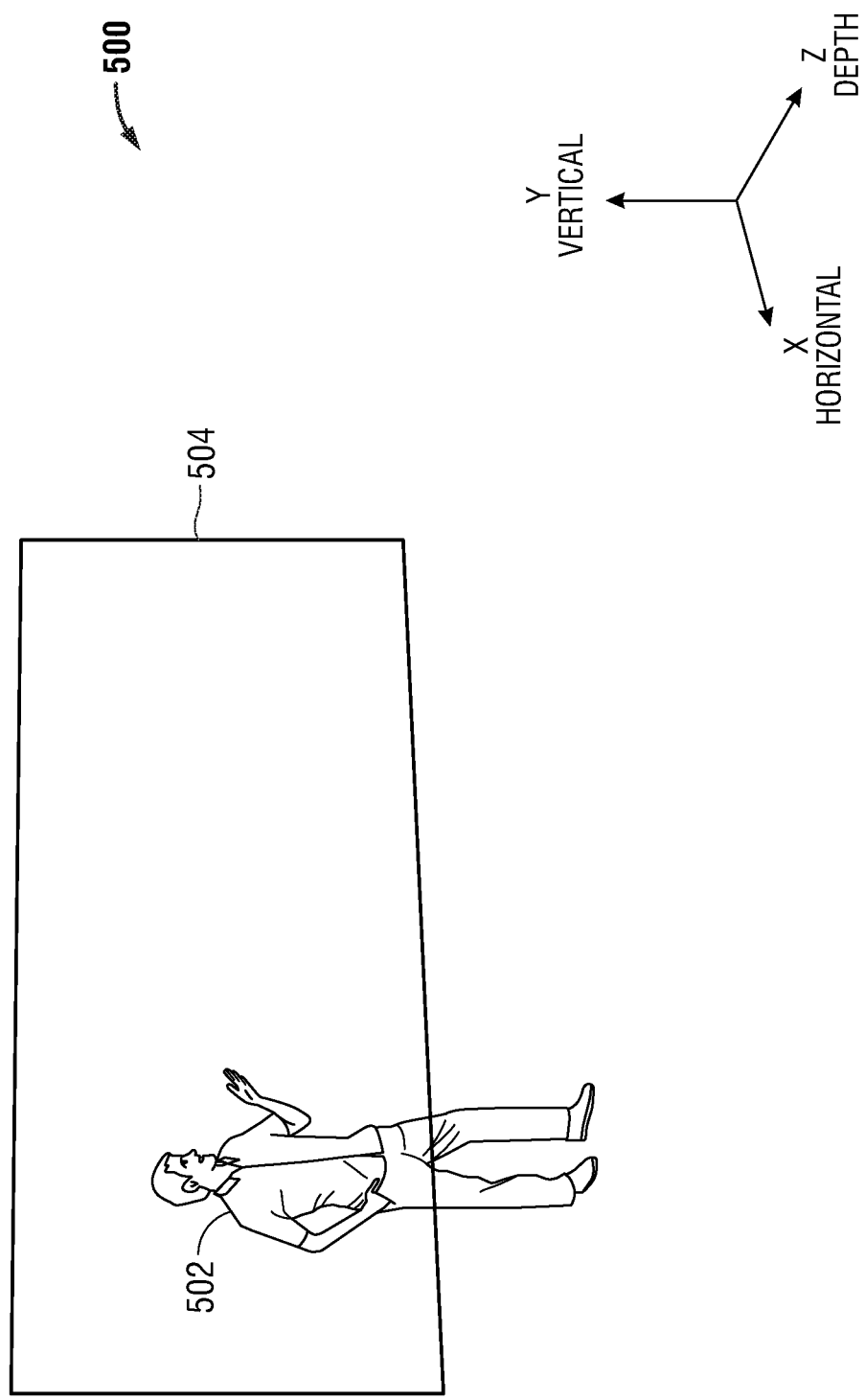
FIG. 5 is a graphical depiction of a presenter's virtual three-dimensional environment according to an embodiment of the present disclosure.

FIG. 5 is a depiction of a presenter's virtual three-dimensional merged environment, according to an embodiment of the present disclosure. As shown in FIG. 5, a presenter's virtual three-dimensional environment 500 may include a primitive of a presentation first presenter 502, and/or a primitive of a non-presenter object 504. In an embodiment, the first presenter 502 and the non-presenter object 504 in the presenter's virtual three dimensional environment 500 may have the location and/or orientation with respect to one another as the location and/or orientation of the presenter and non-presenter object with respect to one another as captured in a three-dimensional image by the presenter's three-dimensional camera array.

Figure 6:
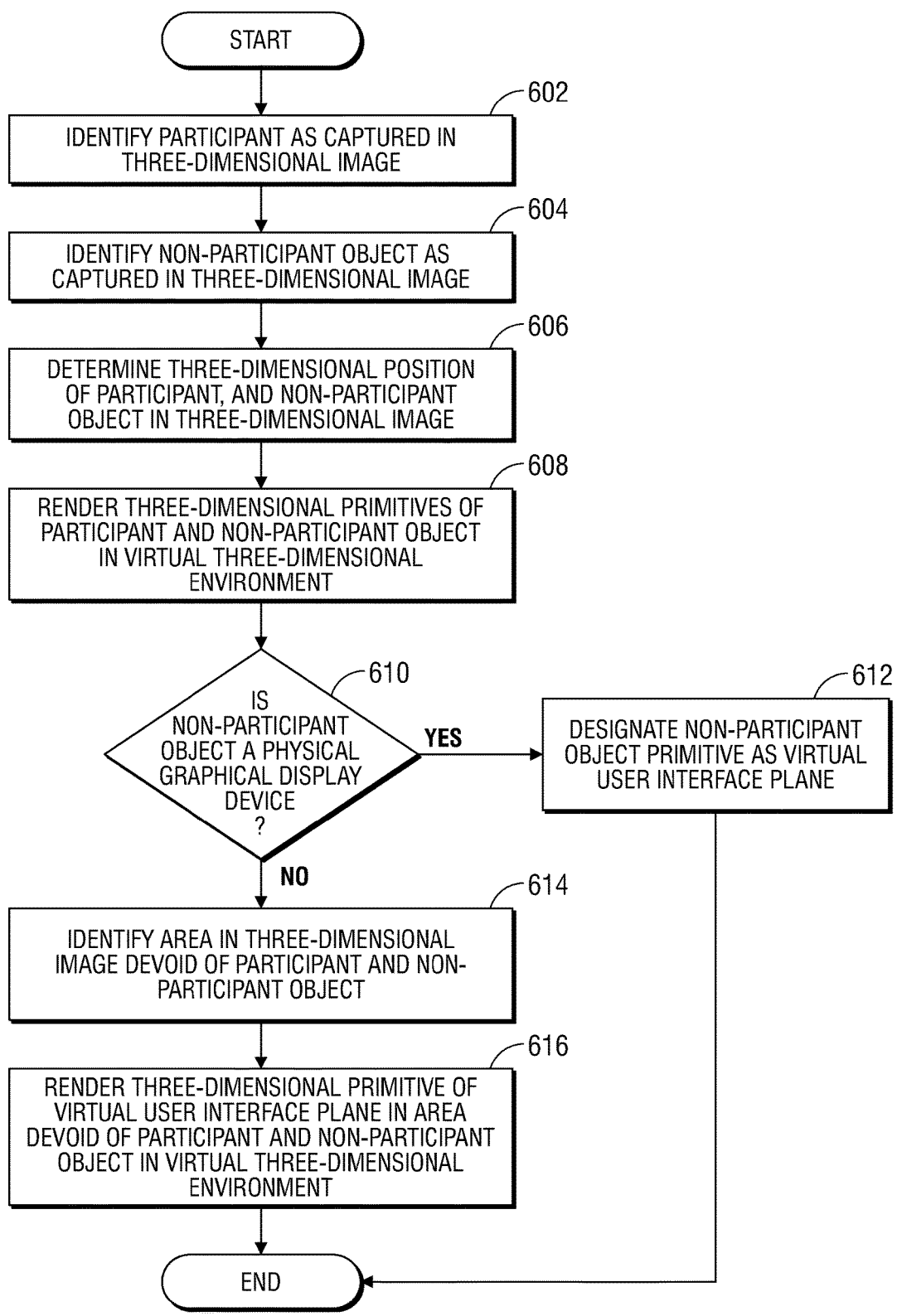
FIG. 6 is a flow diagram illustrating a method of generating a virtual three-dimensional environment according to an embodiment of the present disclosure.

FIG. 6 is a flow diagram illustrating a method of generating a virtual three-dimensional environment with primitives of a participant and a virtual user interface plane. In a particular embodiment, the method may include one or more of identifying a participant and a non-participant object as captured in a three-dimensional image, determining the three-dimensional positions of the participant and non-participant object within the three-dimensional image, render three-dimensional primitives of the participant and the non-participant object in a virtual three-dimensional environment, designating or identifying a virtual user interface plane location, and rendering a virtual user interface plane within the virtual three-dimensional environment.

In an embodiment, the augmented presentation management system may receive a three-dimensional image of a participant, as captured by the participant's three-dimensional camera array. A three-dimensional image of a participant may be captured by the participant's augmented presentation display device. For example, in an embodiment, a three-dimensional image of a presenter may be captured by the presenter's augmented presentation display device. An information handling system may include a presenter's augmented presentation display device, which has the same geographic location as the presenter. Further, there may be any number of presenters, including a presenter and a second presenter. As a further example, a three-dimensional camera array may capture a three-dimensional image of a participant of a presentation, and a non-participant object. In an embodiment, the participant may be a presenter, or an observer, and there may be any number of presenters or observers. For example, the participant 202 in an embodiment, as shown in FIG. 2 may be a presenter, an observer, and/or a second presenter. As yet a further example, a presenter's augmented presentation display device may include a presenter's three-dimensional camera array, which may operate to capture a three-dimensional image of a presenter a non-presenter object having the same geographic location as the presenter. Similarly, the observer's augmented presentation display device may include an observer's three-dimensional camera array, which may operate to capture a three-dimensional image of an observer, and a non-observer object having the same geographic location as the observer. Finally, a second presenter's augmented presentation display device may exist and have a similar structure and functionality as the presenter's augmented presentation display device, including having a second presenter's three-dimensional camera array which functions to capture a three-dimensional image of a second presenter, and a second non-presenter's object having the same geographical location as the second presenter. Thus, in an embodiment, the augmented presentation management system may receive a three-dimensional image of a presenter and a non-presenter object, as captured by the presenter's three-dimensional camera array, a three-dimensional image of an observer and a non-observer object, as captured by the observer's three-dimensional camera array, and a three-dimensional image of a second presenter and a second non-presenter object, as captured by a second presenter's three-dimensional camera array. An example embodiment of the above may be found in FIG. 3.

At block 602, in an embodiment, a participant of the presentation may be identified in a three-dimensional image. In an embodiment, a three-dimensional image may include positional data indicating the location of any given pixel of the three-dimensional image with respect to the local three-dimensional camera array. The object identification module may, in an embodiment, identify a participant within a received three-dimensional. For example, the object identification module may, in an embodiment, identify a presenter within a three-dimensional image captured by the presenter's three-dimensional camera array, and/or identify an observer within a three-dimensional image captured by the observer's three-dimensional camera array. As part of the identification of a presenter or second presenter, in an embodiment, the object identification module may also determine the borders of the presenter or second presenter within a three-dimensional image. In a further embodiment, the object identification module may identify a second presenter captured by the presenter's three-dimensional camera array, if the presenter and the second presenter share the same geographic location. In yet a further embodiment, the object identification module may identify a second presenter captured by the second presenter's three-dimensional camera array, if the presenter and the second presenter do not share the same geographical location. As part of the identification of a presenter or second presenter, in an embodiment, the object identification module may also determine the borders of the presenter or second presenter within a three-dimensional image.

As described in the embodiment depicted in FIG. 3, the augmented presentation management system 132 may include an object identification module 304. In an embodiment, the object identification module may access any captured three-dimensional image of a participant. It is contemplated the object identification module may perform this determination using any number of object detection techniques. These techniques may include, but may not be limited to edge detection, edge matching, primal sketch, the Marr, Mohan and Nevatia approach, the Lowe approach, the Olivier Faugeras approach, divide and conquer search, greyscale matching, gradient matching, using histograms of receptive field responses, eigenfeature search, interpretation trees, hypothesize and test methods, pose consistency method, pose clustering method, invariance method, geometric hashing, scale-invariant feature transform method, and the speeded up robust features method.

In an embodiment, the object identification module could also use "sparse coding" to determine the boundaries of the first presenter within the three-dimensional image. Generally speaking, sparse coding uses mathematical optimization algorithms to roughly detect elements of an object in an image and correlate those elements with objects in a dictionary of known object images. Sparse coding only tries to match a few of the attributes from a captured image to a few of the attributes of an object in a dictionary of known objects. The goal of sparse coding is to use mathematical optimization techniques to produce the fewest attributes in a dictionary of known objects (given in linear coefficients of dictionary columns where the dictionary is in matrix form) that best reconstruct the attributes of the captured image (given as an input signal in the form of a vector). Sparse coding has been applied to high and low level vision tasks, including face recognition, image classification, image denoising and inpainting and anomaly detection in video. The end product of this method is the identification of objects.

At block 604, in an embodiment, a non-participant object may be identified within the three-dimensional image received from the augmented presentation display device. In an embodiment, the object identification module may also identify a non-participant object in the three-dimensional image using the same techniques described above. For example, the object identification module may identify a non-presenter object within a three-dimensional image captured by the presenter's three-dimensional camera array, identify a non-observer object within a three-dimensional image captured by the observer's three-dimensional camera array, and/or identify a second non-presenter object within a three-dimensional image captured by the second presenter's three-dimensional camera array. For example, in an embodiment, the augmented presentation management system may receive a three-dimensional image of a presenter and a non-presenter object, as captured by the presenter's three-dimensional camera array, a three-dimensional image of an observer and a non-observer object, as captured by the observer's three-dimensional camera array, and a three-dimensional image of a second presenter and a second non-presenter object, as captured by a second presenter's three-dimensional camera array. As part of the determination of the three-dimensional position of the presenter or second presenter, the three-dimensional mapping module may also determine the three-dimensional position of the borders of the presenter or second presenter.

Proceeding to block 606, in an embodiment, the three-dimensional position of the participant, and non-participant object identified in the three dimensional image may be determined. In an embodiment, the three-dimensional mapping module may determine the three-dimensional position of the participant and non-participant object as captured in the three-dimensional image. The three-dimensional mapping module in an embodiment may access any three-dimensional image of a participant and non-participant object, and data describing the identification of the participant and/or non participant object within the three-dimensional image, as determined by the object identification module. In an embodiment, the three-dimensional mapping module may cross-correlate the determination made by the object identification module of which pixels within the first three-dimensional image comprise the participant or the non-participant object with the location data associated within those pixels as captured or calculated in the three-dimensional image. In this way, the three-dimensional mapping module may determine the location of the participant and the non-participant object as captured in the three-dimensional image, as well as their distance from one another. For example, in an embodiment, the three-dimensional mapping module may determine the location of a presenter and a non-presenter object as captured in the three-dimensional image taken by the presenter's three-dimensional camera array, and/or the three-dimensional mapping module may determine the location of an observer and a non-observer object as captured in the three-dimensional image taken by the observer's three-dimensional camera array. In a further embodiment, the three-dimensional mapping module may also determine the location of a second presenter as captured in the three-dimensional image taken by the presenter's three-dimensional camera array, if the presenter and second presenter share the same geographic location. In yet a further embodiment, the three-dimensional mapping module may also determine the location of a second presenter and a second non-presenter object as captured in the three-dimensional image taken by the second presenter's three-dimensional camera array, if the presenter and second presenter do not share the same geographic location.

At block 608, in an embodiment, three-dimensional primitives of the participant and the non-participant object may be rendered in a virtual three-dimensional environment. In an embodiment, the three-dimensional mapping module may render three-dimensional primitives of the participant and the non-participant object in a virtual three-dimensional environment. For example, in the embodiment described with reference to FIG. 2, the participant 202 may be standing nearby a non-participant object 206. The three-dimensional camera array 204 may capture a three-dimensional image of the participant 202 and non-participant object 206, which includes positional data describing the three-dimensional position and orientation of the participant 202 and the non-participant object 206 with reference to one another. The three-dimensional mapping module in an embodiment, may access data describing the determination of the three-dimensional position of the participant and non-participant object, as described above. For example, the three-dimensional mapping module in an embodiment may access data describing the location of a presenter and a non-presenter object as captured in the three-dimensional image taken by the presenter's three-dimensional camera array, and/or data describing the location of an observer and a non-observer object as captured in the three-dimensional image taken by the observer's three-dimensional camera array. In a further embodiment, the three-dimensional mapping module may access data describing the location of a second presenter as captured in the three-dimensional image taken by the presenter's three-dimensional camera array, if the presenter and second presenter share the same geographic location. In yet a further embodiment, the three-dimensional mapping module may also access data describing the location of a second presenter and a second non-presenter object as captured in the three-dimensional image taken by the second presenter's three-dimensional camera array, if the presenter and second presenter do not share the same geographic location.

The three-dimensional mapping module in an embodiment may render three-dimensional primitives of the participant and the non-participant object in a virtual three-dimensional environment such that the primitives of the participant and non-participant object have the same location and orientation with respect to one another in the virtual three-dimensional environment as the participant and non-participant object's location and orientation have with respect to one another in the three-dimensional image. For example, in an embodiment described with reference to FIG. 5, the three-dimensional mapping module may generate a presenter's three-dimensional virtual environment 500, which includes a three-dimensional primitive of a presenter 502 and a primitive of a non-presenter object 504, such that the primitives of the presenter and the non-presenter object have the same location and orientation within the virtual three-dimensional environment with respect to one another as the presenter's and non-presenter object's location and orientation have with respect to one another in the three-dimensional image captured by the presenter's three-dimensional camera array. As another example embodiment, the three-dimensional mapping module may generate an observer's virtual three-dimensional environment, which includes a three-dimensional primitive of an observer and a primitive of a non-observer object, such that the primitives of the observer and the non-observer object have the same location and orientation within the virtual three-dimensional environment with respect to one another as the observer's and non-observer object's location and orientation have with respect to one another in the three-dimensional image captured by the observer's three-dimensional camera array.

As a further example embodiment in which the presenter and second presenter share the same geographic location, the three-dimensional mapping module may generate a presenter's virtual three-dimensional environment, which includes a three-dimensional primitive of a presenter, a second presenter, and a primitive of a non-presenter object, such that the primitives of the presenter, the second presenter, and the non-presenter object have the same location and orientation within the virtual three-dimensional environment with respect to one another as the presenter's, second presenter's, and non-presenter object's location and orientation have with respect to one another in the three-dimensional image captured by the presenter's three-dimensional camera array. As yet another example, in a further embodiment, the presenter and second presenter do not share the same geographic location and the three-dimensional mapping module may generate a second presenter's virtual three-dimensional environment, which includes a three-dimensional primitive of a second presenter and a primitive of a second non-presenter object, such that the primitives of the second presenter and the second non-presenter object have the same location and orientation within the virtual three-dimensional environment with respect to one another as the second presenter's and second non-presenter object's location and orientation have with respect to one another in the three-dimensional image captured by the second presenter's three-dimensional camera array.

At block 610, in an embodiment, a determination is made whether the identified non-participant object is a physical graphical display device. In an embodiment, the object identification module may determine whether the non-participant object is a physical graphical display device that may display presentation graphical display elements. As described with reference to embodiments above, a non-participant object may be any object in the room with the participant, other than the participant himself or herself, that may be captured in the three-dimensional image. For example, in an embodiment, the non-participant object may be a digital display device, such as a television or computer monitor, or could be completely unrelated to display, such as a piece of furniture. In another embodiment, the presenter's augmented presentation display device may include a presenter's digital display, and the observer's augmented presentation display device may include an observer's digital display. It is also understood that the presenter's digital display and/or the observer's digital display, in an embodiment may include a physical graphical display device such as, for example, a flat panel display or may operate as a head-mounted display device to generate an augmented reality display. In other words, the object identification module may determine whether the non-participant object identified in the three-dimensional image may function as a physical graphical display device for the presentation that displays all presentation-related materials at his location, rather than the participant using an augmented reality device to display a virtual image of the presentation-related materials at his location.

In an aspect, the object identification module may determine whether the non-presenter object identified in the three-dimensional image captured by the presenter's three-dimensional camera array may function as the presenter's digital display. In another aspect, the object identification module may determine whether the non-observer object identified in the three-dimensional image captured by the observer's three-dimensional camera array may function as the observer's digital display. As yet another example, in another embodiment, the object identification module may determine whether the second non-observer object identified in the three-dimensional image captured by the second presenter's three-dimensional camera array may function as the second presenter's digital display.

Proceeding to block 612, in an embodiment, if the non-participant object identified in the three-dimensional image is further identified as a physical graphical display device, the non-participant object primitive in the virtual three-dimensional environment may be designated as a virtual user interface plane primitive. In an embodiment, if the object identification module identifies the non-participant object identified in the three-dimensional image as a physical graphical display device, the three-dimensional mapping module may designate the non-participant object primitive as the virtual user interface plane primitive in the virtual three-dimensional environment. For example, in the embodiment described with reference to FIG. 5, if the object identification module identifies the non-presenter object identified in the three-dimensional image captured by the presenter's three-dimensional camera array as a physical graphical display device, the three-dimensional mapping module may designate the non-presenter object primitive 504 rendered in the presenter's virtual three-dimensional environment 500 as the presenter's virtual user interface plane primitive. As another example, in a further aspect of an embodiment, if the object identification module identifies the non-observer object identified in the three-dimensional image captured by the observer's three-dimensional camera array as a physical graphical display device, the three-dimensional mapping module may designate the non-observer object primitive rendered in the observer's virtual three-dimensional environment as the observer's virtual user interface plane primitive. As yet another example, in a further embodiment, if the object identification module identifies the second non-presenter object identified in the three-dimensional image captured by the second presenter's three-dimensional camera array as a physical graphical display device, the three-dimensional mapping module may designate the second non-presenter object primitive rendered in the second presenter's virtual three-dimensional environment as the second presenter's virtual user interface plane primitive.

At block 614, in an embodiment, if the non-participant object identified in the three-dimensional image is not further identified as a physical graphical display device, an area within the three-dimensional image devoid of a participant or a non-participant object may be identified. In an embodiment, if the non-participant object identified in the three-dimensional image is not further identified as a physical graphical display device, the three-dimensional mapping module may identify an area within the three-dimensional image devoid of a participant or a non-participant object. If the non-participant object is not identified as a physical graphical display device in an embodiment, this may indicate the display device of the participant's augmented presentation display device may operate as a head-mounted display device to display a virtual user interface rather than as a physical graphical display device. This may further indicate any identified non-participant object may create an obstacle to viewing of the virtual user interface. In such a case, the three-dimensional mapping module in an embodiment may identify an area in the three-dimensional image, within the vicinity of the participant, where a head-mounted display device may display a virtual user interface without a risk of a non-participant object obstructing that view.

For example, in an embodiment, the three-dimensional mapping module may identify an area devoid of a presenter, a second presenter, or a non-presenter object within the three-dimensional image captured by the presenter's three-dimensional camera array, in which a head-mounted display device may display a virtual user interface without a risk of a non-presenter object obstructing that view. As another example, in another aspect of an embodiment, the three-dimensional mapping module may identify an area devoid of an observer, or a non-observer object within the three-dimensional image captured by the observer's three-dimensional camera array, in which a head-mounted display device may display a virtual user interface without a risk of a non-observer object obstructing that view. As yet another example, in a further embodiment, the three-dimensional mapping module may identify an area devoid of a second presenter, or a second non-presenter object within the three-dimensional image captured by the second presenter's three-dimensional camera array, in which a head-mounted display device may display a virtual user interface without a risk of a second non-presenter object obstructing that view.

At block 616, in an embodiment, a primitive of a virtual user interface plane may be rendered within the virtual three-dimensional environment in the area identified as devoid of participants and non-participant objects. In an embodiment, the three-dimensional mapping module may render a primitive of a virtual user interface plane within the virtual three-dimensional environment in the area identified as devoid of participants and non-participant objects. For example, in the embodiment described with reference to FIG. 5, the three-dimensional mapping module may render a primitive of a presenter's virtual user interface plane 504 within the presenter's virtual three-dimensional environment 500 in the area identified by the three-dimensional mapping module as devoid of a presenter, a second presenter, or a non-presenter object. As another example, in a further aspect of an embodiment, the three-dimensional mapping module may render a primitive of an observer's virtual user interface plane within the observer's virtual three-dimensional environment in the area identified by the three-dimensional mapping module as devoid of an observer, and/or a non-observer object. As yet another example, in a further embodiment, the three-dimensional mapping module may render a primitive of a primitive of a second presenter's virtual user interface plane within the second presenter's virtual three-dimensional environment in the area identified by the three-dimensional mapping module as devoid of a second presenter, and/or a second non-presenter's object.

Figure 7:
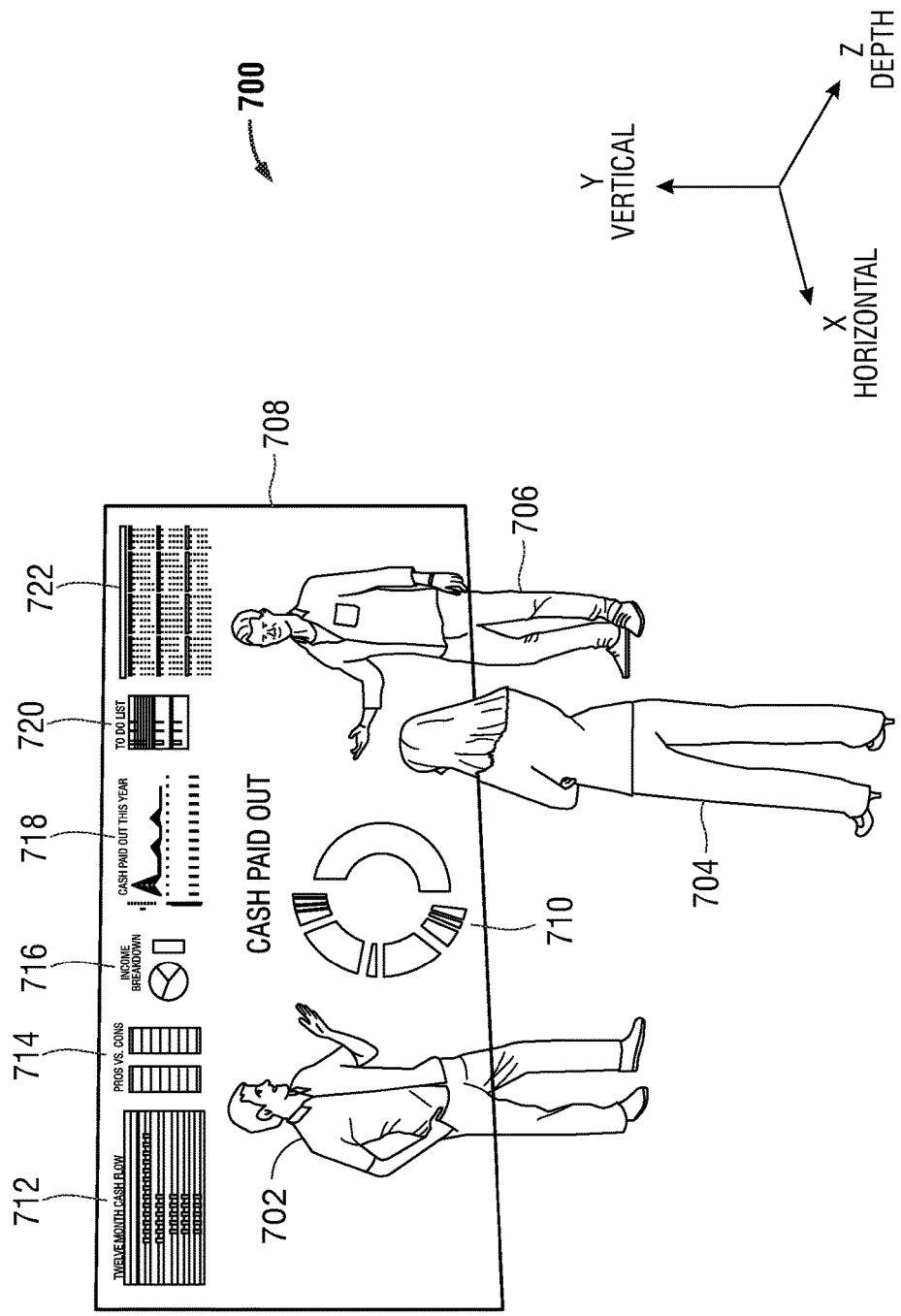
FIG. 7 is a graphical depiction of a three-dimensional merged virtual environment, according to an embodiment of the present disclosure.

FIG. 7 is a depiction of a three-dimensional merged virtual environment, according to an embodiment of the present disclosure. As shown in FIG. 7, a three-dimensional merged virtual environment 700 may include any or all of the following elements: a primitive of a presentation first presenter 702, a primitive of an observer 704, a primitive of a second presenter 706, a merged virtual user interface plane primitive 708, and one or more virtual, shared presentation graphical display elements 710-722. Shared presentation graphical elements may include presentation details including graphs and charts of a variety of types, images including in two dimensional images or CAD images, video images, softkeys, menus, control elements, and other presentation details that may be used during presentation of materials to participants and observers. As also shown in FIG. 7, each of these primitives may appear to be virtually located in the same geographical location.

Figure 8:
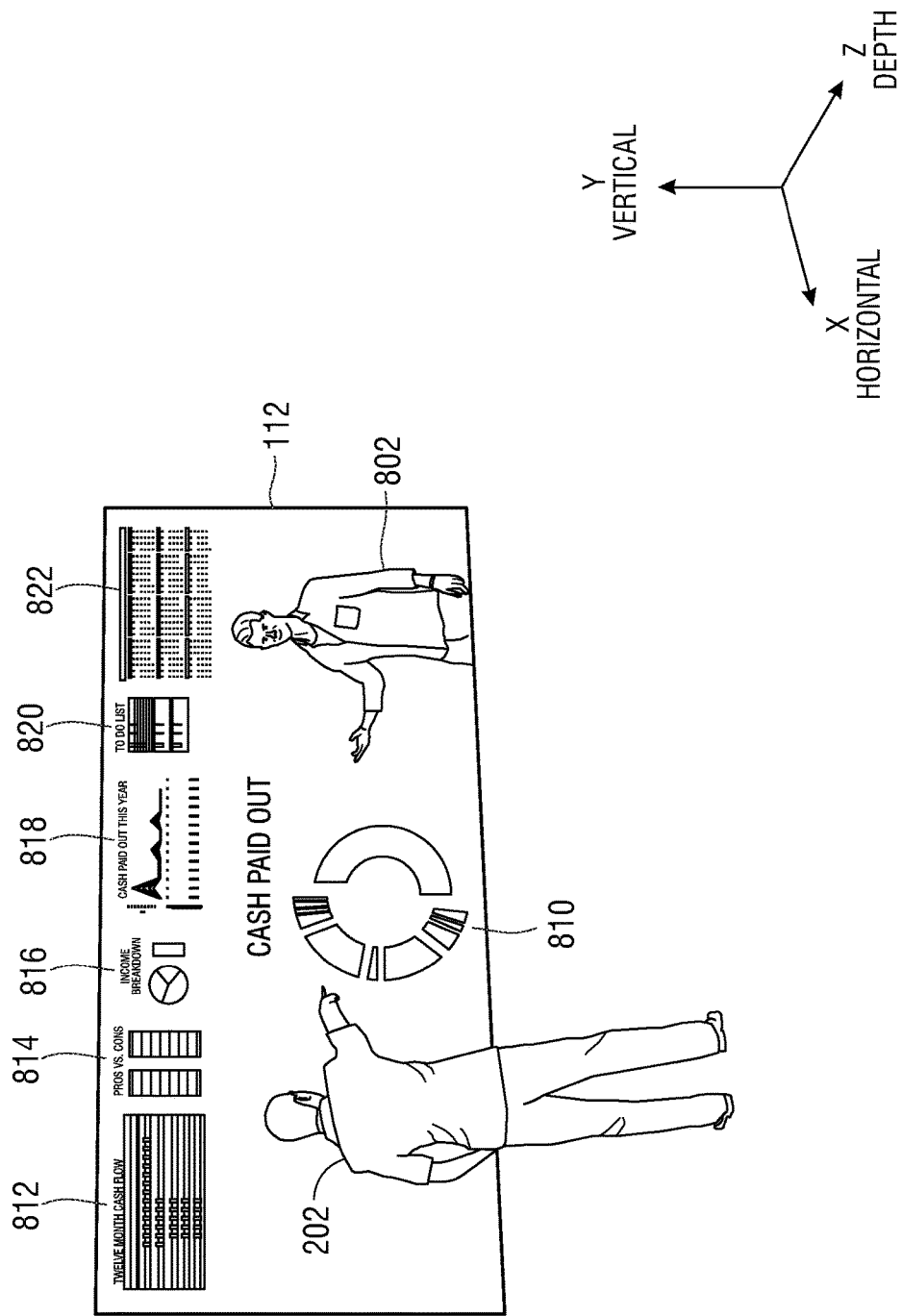
FIG. 8 is a graphical depiction of a presenter and a presenter's augmented presentation display device according to an embodiment of the present disclosure.

FIG. 8 is a depiction of a first presenter standing beside a presenter's augmented presentation display device displaying an image of a second presenter and multiple presentation graphical display elements, according to an embodiment of the present disclosure. As shown in FIG. 8, a presenter 202 may be standing nearby a first augmented presentation display device 112, which displays a three-dimensional image of a second presenter 802 and multiple presentation graphical display elements 810-822. Shared presentation graphical elements may include presentation details as described above and other as understood in the art.

Figure 9:
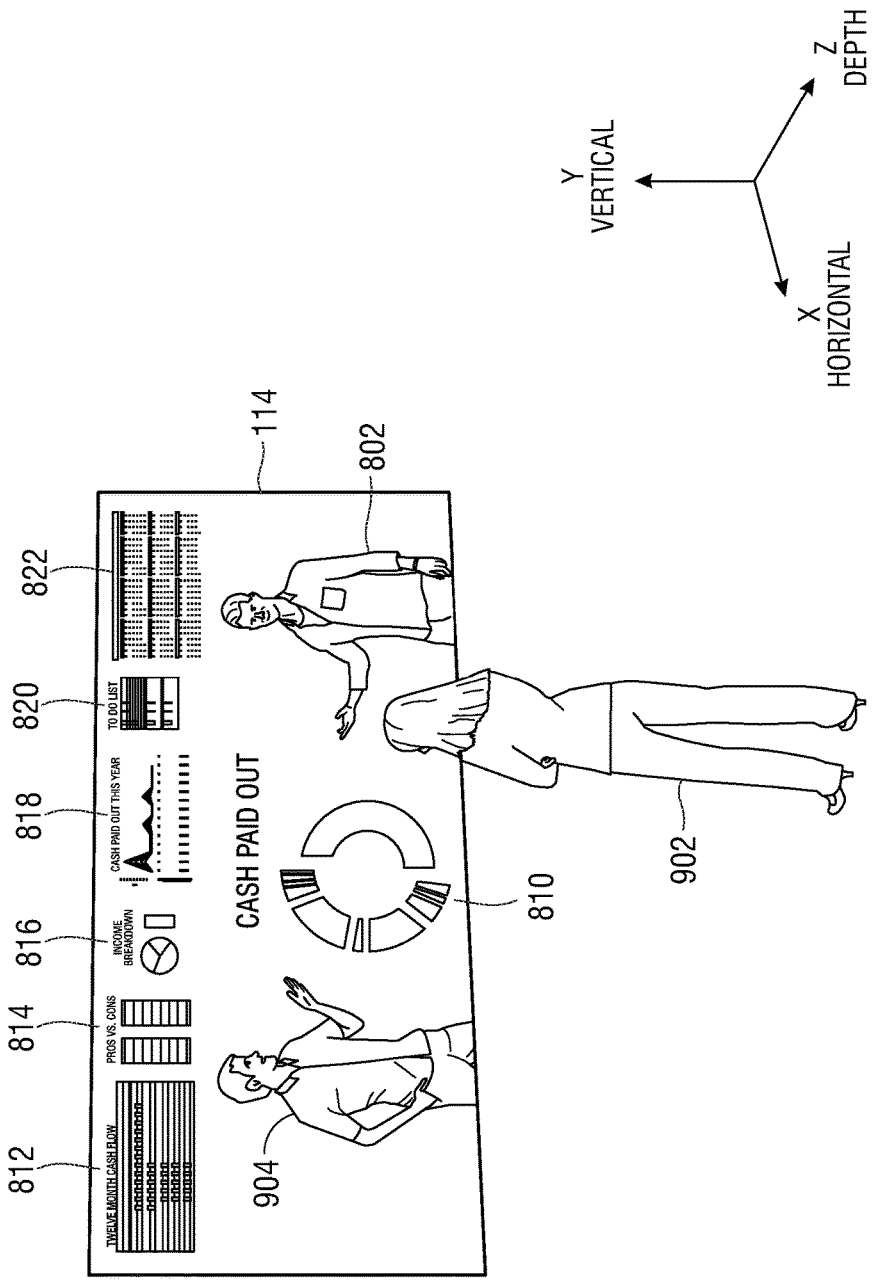
FIG. 9 is a graphical depiction of an observer and an observer's augmented presentation display device according to an embodiment of the present disclosure.

FIG. 9 is a depiction of an observer standing beside an observer's augmented presentation display device displaying an image of a presenter and a second presenter and multiple presentation graphical display elements, according to an embodiment of the present disclosure. As shown in FIG. 9, an observer 902 may be standing nearby an observer's augmented presentation display device 114, which may display a three-dimensional image of a presenter 904, a three-dimensional image of a second presenter 802 and multiple presentation graphical display elements 810-822.

Figure 10:
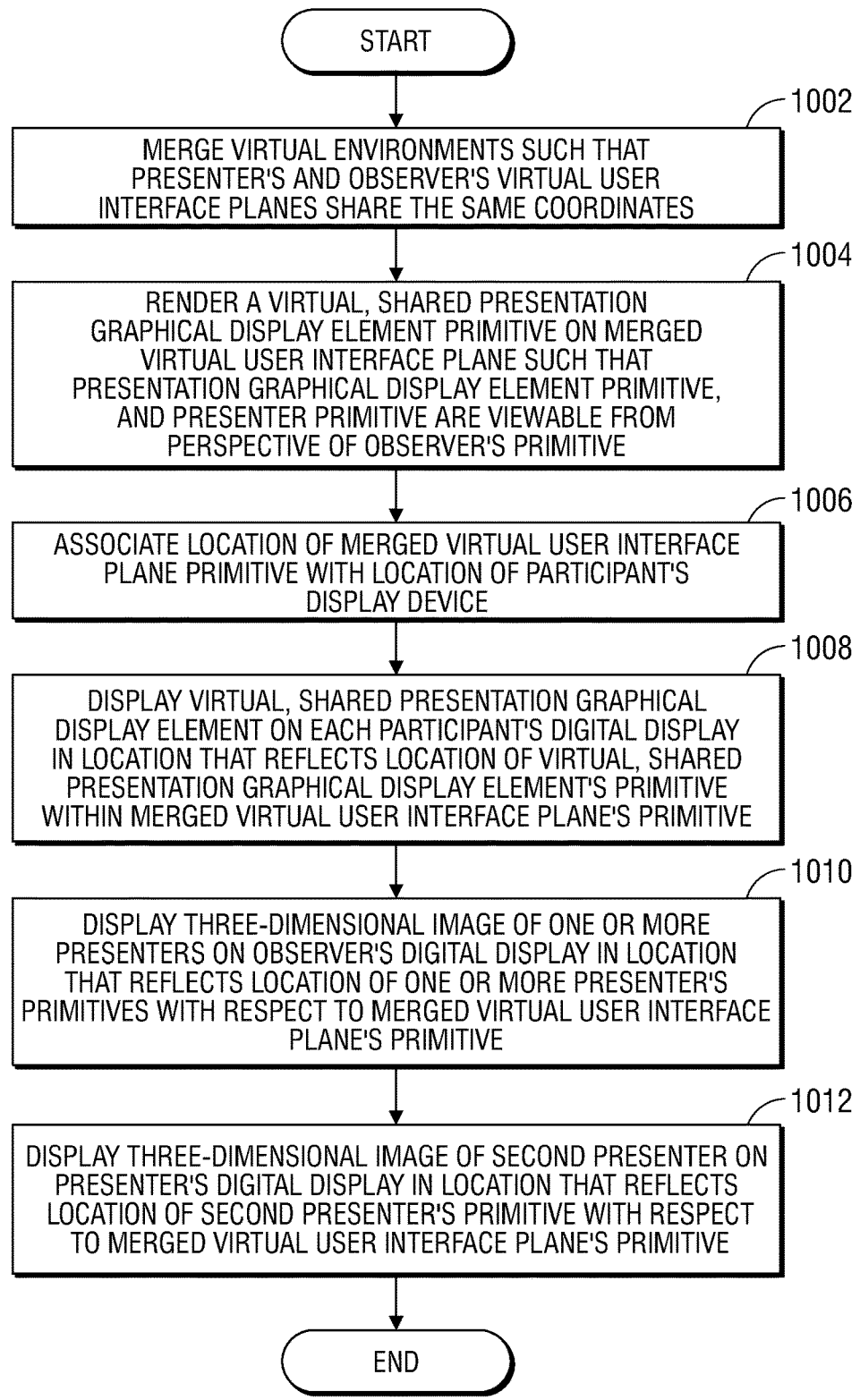
FIG. 10 is a flow diagram illustrating a method of displaying a presentation graphical display element and an image of a participant on an augmented presentation display device, according to an embodiment of the present disclosure.

FIG. 10 is a flow diagram illustrating a method of displaying a presentation graphical display element and a three-dimensional image of a participant on an augmented presentation display device. In a particular embodiment, the method may include one or more of merging presenter's and observer's virtual three-dimensional environments such that presenter's and observer's virtual user interface plane primitives share the same coordinates in a merged virtual three-dimensional environment, to create a merged virtual user interface plane primitive, rendering a virtual, shared presentation graphical display element primitive on the merged virtual user interface plane primitive such that the presentation graphical display element primitive and the presenter's primitive are viewable from the perspective of the observer's primitive, displaying the a virtual, shared presentation graphical display element on the presenter's digital display in the location of the virtual, shared presentation graphical display element with respect to the merged virtual user interface plane's primitive, and displaying an image of a presenter and a virtual, shared presentation graphical display element on the observer's digital display in the location of the presenter's and the virtual, shared presentation graphical display element's primitives, respectively, with respect to the merged virtual user interface plane's primitive.

In an embodiment, the augmented presentation management system may access one or more of the following: a presenter's virtual three-dimensional environment which may include a primitive of a presenter, a second presenter and a primitive of a presenter's virtual user interface plane, an observer's virtual three-dimensional environment which may include a primitive of an observer and a primitive of an observer's virtual user interface plane, and a second presenter's virtual three-dimensional environment which may include a primitive of a second presenter and a primitive of a second presenter's virtual user interface plane.

At block 1002, in an embodiment, two or more virtual three-dimensional environments may be merged for the presenter and observer. In an embodiment, a primitive merger module may merge two or more virtual three-dimensional environments such that the presenter's and observer's virtual user interface plane primitives share the same coordinates. The augmented presentation management system may include a primitive merger module as described above. The embodiment described with reference to FIG. 5 depicts a presenter's virtual three-dimensional environment 500, including a primitive of a presenter 502 and a primitive of a presenter's virtual user interface plane 504. Similarly, in another aspect of an embodiment, an observer's virtual three-dimensional environment may exist, including a primitive of an observer and an observer's virtual user interface plane. In another embodiment, a second presenter's virtual three-dimensional environment may also exist, including a primitive of second presenter and a second presenter's virtual user interface plane. The primitive merger module in an embodiment may merge two or more of these virtual three-dimensional environments together to form a merged virtual three-dimensional environment such that the presenter's and observer's virtual user interface plane primitives share the same coordinates in the merged virtual three-dimensional environment. For example, in the embodiment depicted with reference to FIG. 7, the primitive merger module may merge the presenter's virtual three-dimensional environment with the observer's virtual three-dimensional environment and/or the second presenter's virtual three-dimensional environment to generate a merged virtual three-dimensional environment 700, which includes a presenter primitive 502, an observer primitive 704, a second presenter primitive 706, and a merged virtual user interface plane primitive 708. As a further example, with reference to the embodiment described in FIG. 7, the primitive merger module may merge the presenter's virtual three-dimensional environment with the observer's virtual three-dimensional environment and/or the second presenter's virtual three-dimensional environment such that the presenter's virtual user interface plane shares the same coordinates in the merged virtual three-dimensional environment 700 as the observer's virtual user interface plane and/or the second presenter's virtual user interface plane, and may designate all three of those virtual user interface plane primitives as a merged virtual user interface plane primitive 708.

At block 1004, in an embodiment, a virtual, shared presentation graphical display element primitive may be rendered on the merged virtual user interface plane primitive such that the presentation graphical display element primitive, and the presenter primitive are viewable from the perspective of the observer's primitive within the merged virtual three-dimensional environment. In an embodiment, the three-dimensional mapping module may render a virtual, shared presentation graphical display element primitive on the merged virtual user interface plane primitive such that the presentation graphical display element primitive, and the presenter primitive are viewable from the perspective of the observer's primitive within the merged virtual three-dimensional environment. For example, with reference to the embodiment described in FIG. 7, the three-dimensional mapping module may render the virtual, shared presentation graphical display element primitives 710-722 on the merged virtual user interface plane primitive 708 such that the virtual, shared presentation graphical display element primitives 710-722, the presenter primitive 502, and the second presenter primitive 706 are all viewable from the perspective of the observer primitive 704 within the merged virtual three-dimensional environment 700. In other words, with reference to the embodiment described in FIG. 7, the three-dimensional mapping module may render the virtual, shared presentation graphical display element primitives 710-722 on the merged virtual user interface plane primitive 708 such that the presenter primitive 502, and the second presenter primitive 706 do not obscure the view of the virtual, shared presentation graphical display element primitives 710-722, from the perspective of the observer primitive 704 within the merged virtual three-dimensional environment 700. In yet another example, in an embodiment, the three-dimensional mapping module may render a virtual, shared presentation graphical display element primitive on the merged virtual user interface plane primitive such that the presentation graphical display element primitive is located outside the boundaries of the presenter's primitive and/or the second presenter's primitive.

At block 1006, in an embodiment, the location of merged virtual user interface plane primitive within the merged virtual three-dimensional environment may be associated with the location of each participant's display device in physical reality. In an embodiment, the three-dimensional mapping module may associate the location of merged virtual user interface plane primitive within the merged virtual three-dimensional environment with the location of each participant's display device in physical reality. For example, with reference to the embodiment described in FIG. 7, the three-dimensional mapping module may associate the location of the merged virtual user interface plane primitive 708 within the virtual three-dimensional environment 700 with the location of the presenter's display device and the observer's display device in physical reality.

At block 1008, in an embodiment, a virtual, shared presentation graphical display element may be displayed on each participant's digital display in a location that reflects the location of the virtual, shared presentation graphical display element's primitive within the merged virtual user interface plane's primitive. In an embodiment, the augmented presentation display module may display a virtual, shared presentation graphical display element on each participant's digital display such that its location within each participant's digital display reflects the location of the virtual, shared presentation graphical display element's primitive within the merged virtual user interface plane's primitive. For example, with reference to the embodiment described with reference to FIG. 8, the augmented presentation display module may display the "cash paid out" pie chart virtual, shared presentation graphical display element on the digital display of the presenter's augmented presentation display device 112 such that the "cash paid out" pie chart virtual, shared presentation graphical display element's location in the middle of the digital display of the presenter's augmented presentation display device 112 in physical reality reflects the location of the "cash paid out" pie chart virtual, shared presentation graphical display element's primitive in the middle of the merged virtual user interface plane's primitive within the merged virtual three-dimensional environment. As another example, with reference to the embodiment described with reference to FIG. 9, the augmented presentation display module may display the "cash paid out" pie chart virtual, shared presentation graphical display element on the digital display of the observer's augmented presentation display device 114 such that the "cash paid out" pie chart virtual, shared presentation graphical display element's location in the middle of the digital display of the presenter's augmented presentation display device 114 in physical reality reflects the location of the "cash paid out" pie chart virtual, shared presentation graphical display element's primitive in the middle of the merged virtual user interface plane's primitive within the merged virtual three-dimensional environment.

At block 1010, a three-dimensional image of one or more presenters may be displayed on the observer's digital display in physical reality in a location that reflects the location of one or more presenters' primitives with respect to the merged virtual user interface plane's primitive in the merged virtual three-dimensional environment. In an embodiment, the augmented presentation display module may display a three-dimensional image of one or more presenters on the observer's digital display in physical reality in a location that reflects the location of one or more presenters' primitives with respect to the merged virtual user interface plane's primitive in the merged virtual three-dimensional environment. For example, with reference to the embodiment described in FIG. 9, the augmented presentation display module may display a three-dimensional image of a presenter 904 on the digital display device of the observer's augmented presentation display device 114 in physical reality in a location that reflects the location of the presenter's primitive with respect to the merged virtual user interface plane's primitive in the merged virtual three-dimensional environment. In another example, with reference to that embodiment, the augmented presentation display module may display a three-dimensional image of a second presenter 802 on the digital display device of the observer's augmented presentation display device 114 in physical reality in a location that reflects the location of the second presenter's primitive with respect to the merged virtual user interface plane's primitive in the merged virtual three-dimensional environment. It is understood the displayed three-dimensional image of a participant in an embodiment may include but not be limited to a display of the three-dimensional image of that participant as captured by that participant's three-dimensional camera array, and/or an avatar of that participant.

At block 1012, in an embodiment, a three-dimensional image of a second presenter may be displayed on the presenter's digital display in a location that reflects the location of the second presenter's primitive with respect to the merged virtual user interface plane's primitive. In an embodiment, the augmented presentation display module may display a three-dimensional image of a second presenter on the presenter's digital display in a location that reflects the location of the second presenter's primitive with respect to the merged virtual user interface plane's primitive. For example, with reference to the embodiment described in FIG. 8, a three-dimensional image of a second presenter 802 may be displayed in the digital display of the presenter's augmented presentation display device 112 in a location that reflects the location of the second presenter's primitive with respect to the merged virtual user interface plane's primitive.

Figure 11:
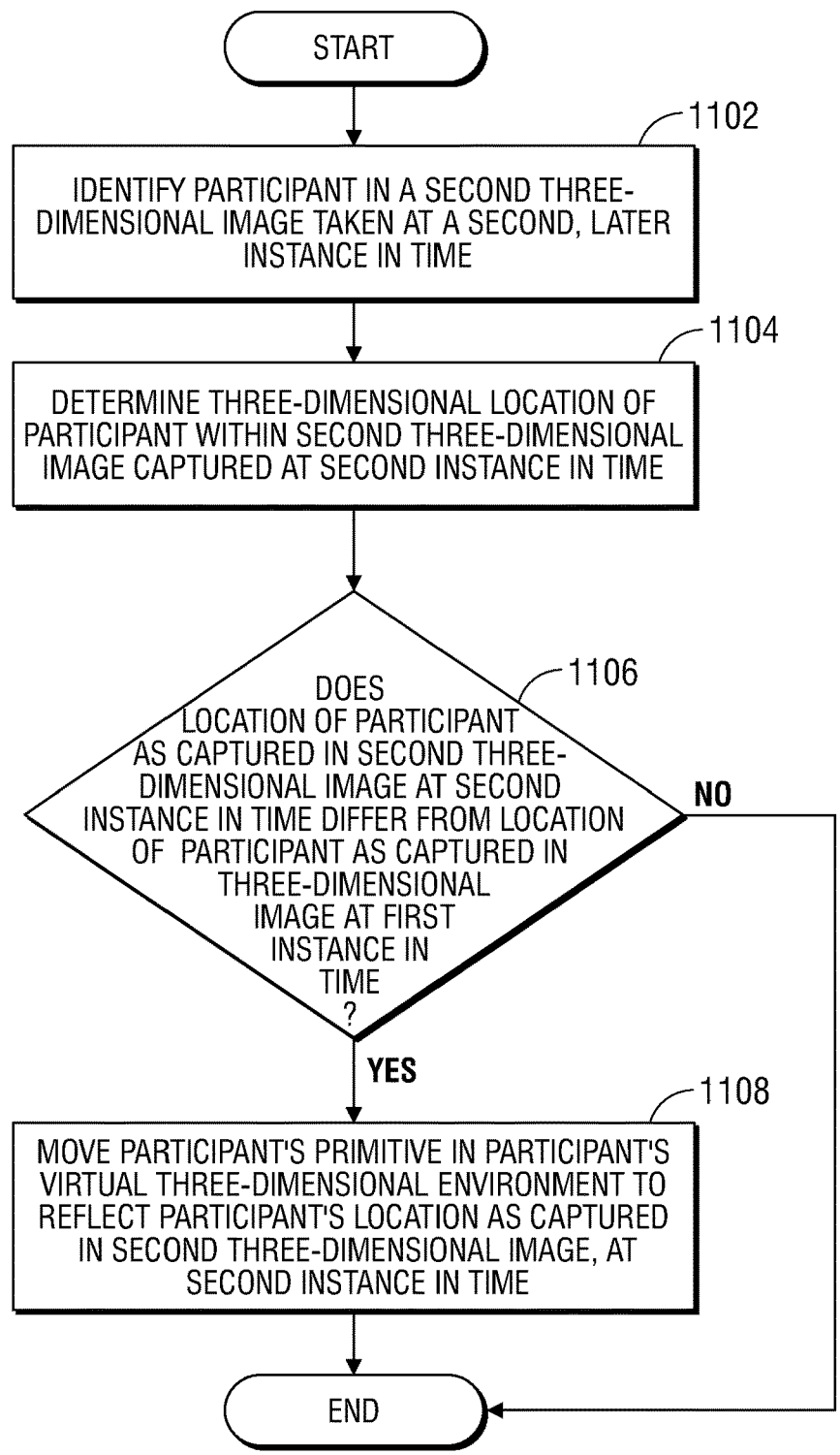
FIG. 11 is a flow diagram illustrating a method of displaying a virtual shared presentation graphical display element and an image of a participant on an augmented presentation display device according to another embodiment of the presentation disclosure.

FIG. 11 is a flow diagram illustrating a method of displaying on an augmented presentation display device a virtual, shared presentation graphical display element and a three-dimensional image of a participant, both having an altered location with respect to the augmented presentation display device at a second instance in time. In a particular embodiment, the method may include one or more of identifying a participant in a second three-dimensional image taken at a second, later instance in time, determining the three-dimensional location of the participant within the second three-dimensional image captured at a second instance in time, determining whether the location of the participant as captured in the second three-dimensional image at a second instance in time differs from the location of the participant as captured in the three-dimensional image at a first instance in time, and if the location of the participant as captured in the second three-dimensional image at a second instance in time differs from the location of the participant s captured in the three-dimensional image at a first instance in time, moving the participant's primitive in the participant's virtual three-dimensional environment to reflect the participant's location with respect to the participant's three-dimensional camera array as captured in the second three-dimensional image, at a second instance in time. For example, the three-dimensional image captured at a second instance in time may be a later image taken in a series of images such as with a video stream of images. In an embodiment, the augmented presentation management system may access one or more of the following: a second three-dimensional image of any participant, captured by that participant's three-dimensional camera array at a second instance in time, and each participant's virtual, three-dimensional environment, as generated by the augmented presentation management system's three-dimensional mapping module. For example, in an embodiment, the augmented presentation management system may access a second three-dimensional image of a presenter and/or a second presenter captured by the presenter's three-dimensional camera array at a second instance in time. As another example, in another aspect of an embodiment, the augmented presentation management system may access a second three-dimensional image of an observer as captured by the observer's three-dimensional camera array at a second instance in time. In yet a further embodiment, the augmented presentation management system may access a second three-dimensional image of a second presenter captured by the second presenter's three-dimensional camera array at a second instance in time.

At block 1102, in an embodiment, a participant may be identified in a second three-dimensional image taken at a second, later instance in time, according to a particular embodiment of this disclosure. In an embodiment, the augmented presentation management system may receive a second three-dimensional image taken at a second, later instance in time, according to a particular embodiment of this disclosure, and the object identification module may identify a participant in a second three-dimensional image captured at a second, later instance in time. For example, in an embodiment, the object identification module may identify a presenter and/or a second presenter in a second three-dimensional image captured at a second, later instance in time by the presenter's three-dimensional camera array. As another example, in another aspect of an embodiment, the object identification module may identify an observer in a second three-dimensional image captured at a second, later instance in time by the observer's three-dimensional camera array. As yet another example, in a further embodiment, the object identification module may identify a second presenter in a second three-dimensional image captured at a second, later instance in time by the second presenter's three-dimensional camera array.

As described above, the augmented presentation management system may include an object identification module. In an embodiment, the object identification module may access any three-dimensional image of a participant captured at a second instance in time. It is contemplated the object identification module may perform this determination using any number of object detection techniques. These techniques may include, but may not be limited to edge detection, edge matching, primal sketch, the Marr, Mohan and Nevatia approach, the Lowe approach, the Olivier Faugeras approach, divide and conquer search, greyscale matching, gradient matching, using histograms of receptive field responses, eigenfeature search, interpretation trees, hypothesize and test methods, pose consistency method, pose clustering method, invariance method, geometric hashing, scale-invariant feature transform method, and the speeded up robust features method. It is understood these techniques may also include a technique called "sparse coding," as described above.

At block 1104, in an embodiment, a three-dimensional location of a participant within the second three-dimensional image captured at a second instance in time may be determined. In an embodiment, the three-dimensional mapping module may determine a three-dimensional location of an identified participant within the second three-dimensional image captured at a second instance in time. The three-dimensional mapping module in an embodiment may access any second three-dimensional images of participants taken at a second instance in time and data describing the identification of the participant within the second three-dimensional image taken at a second instance in time, as determined by the object identification module. In an embodiment, the three-dimensional mapping module may cross-correlate the determination made by the object identification module of which pixels within the second three-dimensional image comprise the participant with the location data associated within those pixels as captured or calculated in the second three-dimensional image. In this way, the three-dimensional mapping module may determine the location of the participant as captured in the second three-dimensional image.

For example, in an embodiment, the three-dimensional mapping module may determine the three-dimensional location of the identified presenter or the identified second presenter within the second three-dimensional image captured by the presenter's three-dimensional camera array at a second instance in time. As another example, in a further aspect of an embodiment, the three-dimensional mapping module may determine the three-dimensional location of the identified observer within the second three-dimensional image captured by the observer's three-dimensional camera array at a second instance in time. As yet another example, in a further embodiment, the three-dimensional mapping module may determine the three-dimensional location of the identified second presenter within the second three-dimensional image captured by the second presenter's three-dimensional camera array at a second instance in time.

At block 1106, in an embodiment, a determination is made whether the location of the participant as captured in the second three-dimensional image at a second instance in time differs from the location of the participant as captured in the three-dimensional image at a first instance in time. In an embodiment, the three-dimensional mapping module may determine whether the location of the participant as captured in the second three-dimensional image at a second instance in time differs from the location of the participant as captured in the three-dimensional image at a first instance in time. The three-dimensional mapping module may access data describing the location of the participant at a first instance in time and the location of the participant at a second instance in time. For example, in an embodiment, the three-dimensional mapping module may access data describing the location of a presenter at a first instance in time with the location of a presenter at a second instance in time. As another example, in a further aspect of an embodiment, the three-dimensional mapping module may access data describing the location of an observer at a first instance in time with the location of an observer at a second instance in time. As yet another example, in a further embodiment, the three-dimensional mapping module may access data describing the location of a second presenter at a first instance in time with the location of a second presenter at a second instance in time.

The three-dimensional mapping module may compare the data describing the location of the participant at a first instance in time with the location of the participant at a second instance in time to determine whether those locations match. For example, in an embodiment, the three-dimensional mapping module may compare the data describing the location of a presenter at a first instance in time with the location of the presenter at a second instance in time to determine whether those locations match. As another example, in another aspect of an embodiment, the three-dimensional mapping module may compare the data describing the location of the observer at a first instance in time with the location of the observer at a second instance in time to determine whether those locations match. As yet another example, in another embodiment, the three-dimensional mapping module may compare the data describing the location of a second presenter at a first instance in time with the location of the second presenter at a second instance in time to determine whether those locations match.

At block 1108, in an embodiment, if the location of the participant at a first instance in time does not match the location of the participant at a second instance in time, the participant's primitive in the participant's virtual three-dimensional environment may be moved to reflect the participant's location as captured in the second three-dimensional image, at a second instance in time. In an embodiment, if the location of the participant at a first instance in time does not match the location of the participant at a second instance in time, the three-dimensional mapping module may move the participant's primitive in the participant's virtual three-dimensional environment to reflect the participant's location as captured in the second three-dimensional image, at a second instance in time. Referring to the embodiment described with respect to FIG. 6, at block 608, the three-dimensional mapping module may render a three-dimensional primitive of a participant in the participant's virtual three-dimensional environment based upon the participant's location in a first three-dimensional image taken at a first instance in time. The three-dimensional mapping module may access this participant's virtual three-dimensional environment based upon a first three-dimensional image taken at a first instance in time. For example, the three-dimensional mapping module may access one or more of the following: a presenter's virtual three-dimensional environment, rendered based on a first three-dimensional image captured by the presenter's three-dimensional camera array at a first instance in time, an observers virtual three-dimensional environment, rendered based on a first three-dimensional image captured by the observer's three-dimensional camera array at a first instance in time, a second presenter's virtual three-dimensional environment, rendered based on a first three-dimensional image captured by the second presenter's three-dimensional camera array at a first instance in time.

For example, in an embodiment, if the location of the presenter or second presenter at a first instance in time does not match the location of the presenter or second presenter at a second instance in time, the three-dimensional mapping module may access the presenter's virtual three-dimensional environment and move the presenter's primitive or the second presenter's primitive to reflect the presenter's or second presenter's location as captured by the presenter's three-dimensional camera array in the second three-dimensional image, at a second instance in time. As another example, in another aspect of an embodiment, if the location of the observer at a first instance in time does not match the location of the observer at a second instance in time the three-dimensional mapping module may access the observer's virtual three-dimensional environment and move the observer's primitive to reflect the observer's location as captured by the observer's three-dimensional camera array in the second three-dimension image, at a second instance in time. As yet another example, in a further embodiment, if the location of the second presenter at a first instance in time does not match the location of the second presenter at a second instance in time the three-dimensional mapping module may access the second presenter's virtual three-dimensional environment and move the second presenter's primitive to reflect the second presenter's location as captured by the second presenter's three-dimensional camera array. It is understood that as a virtual meeting is conducted and time progresses that when the first and second presenters or the observer move substantially with respect to their shared, virtual presentation then the above example embodiment may alter the location of the virtual, shared graphical presentation or any elements of the virtual, shared graphical presentation with respect to any of the first presenter, the second presenter, or the observer as applicable. In this way, an observer or presenter of the virtual meeting and the virtual, shared graphical presentation will maintain an unobstructed view of the presented material even when the participants move with respect to the virtual, shared graphical presentation.

Figure 12:
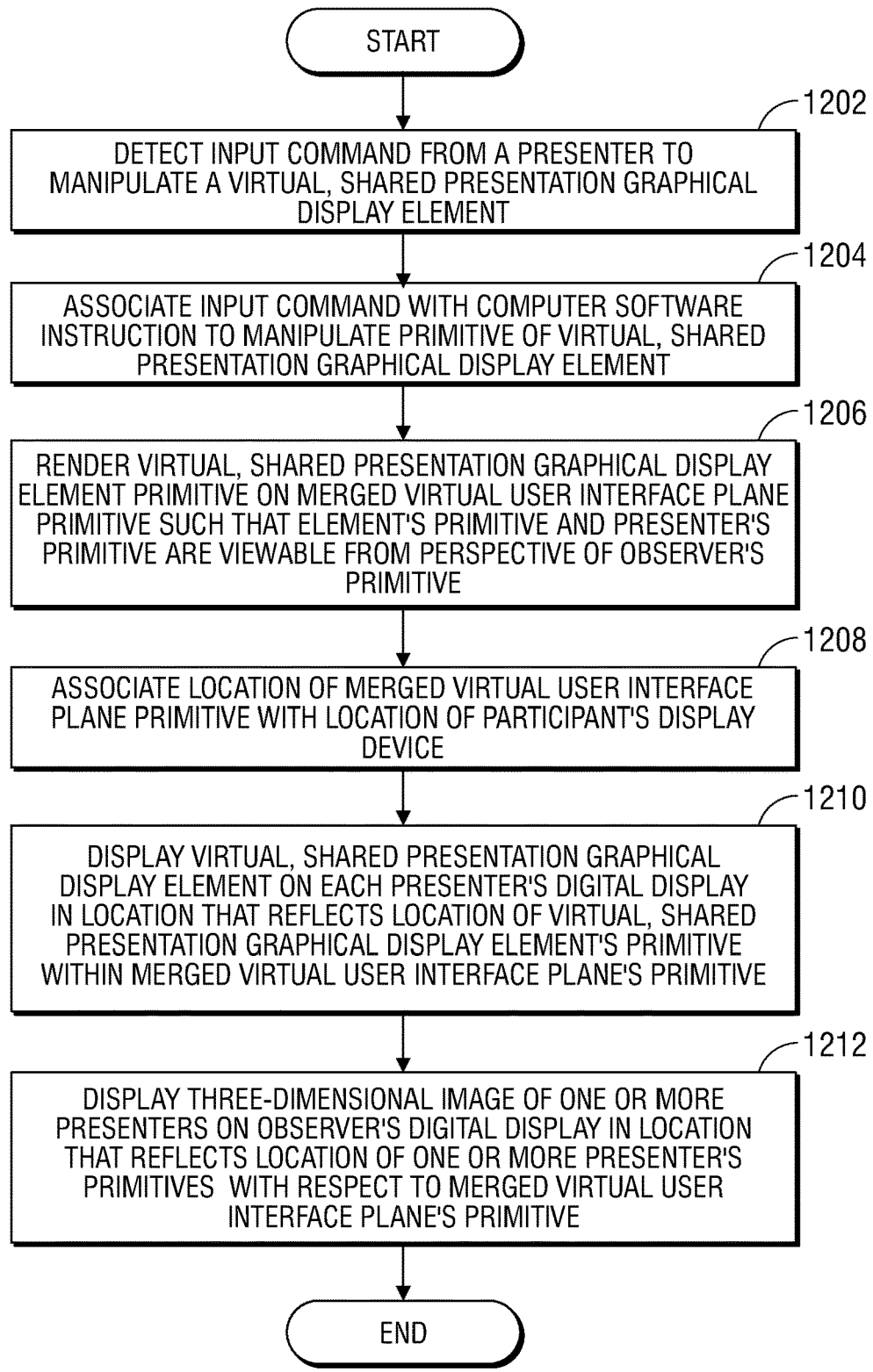
FIG. 12 is a flow diagram illustrating a method of displaying a manipulated virtual shared presentation graphical display element on an augmented presentation display device according to an embodiment of the present disclosure.

FIG. 12 is a flow diagram illustrating a method of displaying a manipulated virtual shared presentation graphical display element. For example, the augmented presentation display module of the present disclosure may display a manipulated virtual shared presentation graphical display element. In a particular embodiment, the method may include one or more of detecting an input command from a participant to manipulate a virtual, shared presentation graphical display element, associating the input command with computer software instructions to manipulate the primitive of a virtual, shared presentation graphical display element within the merged virtual three-dimensional environment, implementing the computer software instruction to manipulate the primitive of the virtual, shared presentation graphical display element within the merged three-dimensional virtual environment, rendering a virtual, shared presentation graphical display element primitive within the merged virtual user interface plane primitive such that the presenter's primitive and the virtual shared presentation graphical display elements primitive are viewable from the perspective of the observer's primitive, displaying the virtual, shared presentation graphical display element on a presenter's augmented presentation display device in same location with respect to presenter's augmented presentation display device as location of virtual, shared presentation graphical display element's primitive with respect to merged virtual user interface plane's primitive, and displaying the images of the presenter and virtual, shared presentation graphical display element on the observer's augmented presentation display device in same location with respect to presenter's augmented presentation display device as location of presenter's primitive with respect to merged virtual user interface plane's primitive.

At block 1202, in an embodiment, an input command from a participant to manipulate a virtual, shared presentation graphical display element may be detected. In an embodiment, the input command detection module may detect an input command from a participant to manipulate a virtual, shared presentation graphical display element. With reference to the embodiment described in FIG. 4, the augmented presentation management system 132 may include an input command recognition module 410. In an embodiment, an augmented presentation management system may access input command received via an input device, and software instructions regarding manipulation of a virtual shared presentation graphical display element. For example, with respect to the embodiment described in FIG. 1, the information handling system 100 may include an input device 118, such as a keyboard, a cursor user input device, or a presentation pointing device. Examples of a cursor user input device or a presentation pointing device may include a stylus, a pen, a mouse, touchpad, or a wearable cursor control or pointing device. In other example embodiments, a voice, gesture or touch screen input may be received at the input command recognition module of the augmented presentation display system. The augmented presentation display devices may display presentation graphical display elements that users may manipulate in order to affect communication between the local presenter and/or the remote presenter and the remote observer. The presenter in an embodiment may affect manipulation of the presentation graphical display elements using a user input device. Thus, in an embodiment, the augmented presentation management system may access an input command in the form of keyboard entry, mouse entry, stylus entry, pen entry, voice command, gesture command, or touch screen entry given in order to affect manipulation of a presentation graphical display element, and software instructions regarding manipulation of the virtual shared presentation graphical display element, as commanded. For example, in the embodiment described with reference to FIG. 8, the input command recognition module in an augmented presentation management system may detect an audio input command from the presenter 202 to enlarge the "cash paid out" pie chart virtual, shared presentation graphical display element 810 in comparison to the other virtual, shared presentation graphical display elements 812-822. It is understood that any of the virtual, shared presentation graphical display elements 810-822 may be selected for manipulation during a presentation including enlarging or altering the view as well as interacting with software applications to perform operations on the virtual, shared presentation graphical display element being manipulated. Any operations may be performed on the virtual, shared presentation graphical display elements 810-822 in accordance with actions supported by underlying software applications providing those elements. Additionally, command menus, softkeys, buttons or other interface virtual, shared presentation graphical display elements may be provided by the augmented presentation display system to allow for commands to be received to the augmented presentation display system itself including orientation commands to pass or move the virtual, shared presentation graphical display to another presenter or to focus view points on a particular point of discussion.

At block 1204, in an embodiment, the input command may be associated with computer software instructions to manipulate the primitive of a virtual, shared presentation graphical display element within the merged virtual three-dimensional environment. In an embodiment, the presentation graphical display element manipulation module may associate the input command with computer software instructions to manipulate the primitive of a virtual, shared presentation graphical display element within the merged virtual three-dimensional environment. With reference to the embodiment described in FIG. 4, the augmented presentation management system 132 may include a presentation graphical display element manipulation module 412. The presentation graphical display element manipulation module 412 may access data regarding the detection of an input command to manipulate a presentation graphical display element. For example with reference to the embodiment described in FIG. 7, the presentation graphical display element manipulation module 412 may access the detecting audio input command to enlarge the "cash paid out" pie chart virtual, shared presentation graphical display element and associate that detected audio input command with computer software instructions to enlarge the "cash paid out" pie chart virtual, shared presentation graphical display element primitive 710 as compared to the other virtual, shared presentation graphical display element primitives 712-722 within the merged, virtual three-dimensional environment 708. It is understood that other manipulation commands are also contemplated with the virtual, shared presentation graphical display element primitives.

At block 1206, in an embodiment, the manipulated, virtual, shared presentation graphical display element primitive may be rendered within the merged virtual user interface plane primitive such that the presenter's primitive and the virtual shared presentation graphical display elements primitive are viewable from the perspective of the observer's primitive. In an embodiment, the three-dimensional mapping module may render the manipulated, virtual, shared presentation graphical display element primitive within the merged virtual user interface plane primitive such that the presenter's primitive and the virtual shared presentation graphical display elements primitive are viewable from the perspective of the observer's primitive. For example, with reference to the embodiment described in FIG. 7, the three-dimensional mapping module may render the enlarged "cash paid out" pie chart virtual, shared presentation graphical display element primitive 710 within the merged user interface plane primitive 708 such that the presenter's primitive 502 and the enlarged "cash paid out" pie chart virtual, shared presentation graphical display element primitive 710 are viewable from the perspective of the observer's primitive 704. In yet another example, in an embodiment, the three-dimensional mapping module may render a virtual, shared presentation graphical display element primitive on the merged virtual user interface plane primitive such that the presentation graphical display element primitive is located outside the boundaries of the presenter's primitive and/or the second presenter's primitive.

In an embodiment, the augmented presentation management system may also access the merged, virtual three-dimensional environment, a three-dimensional location of a virtual shared presentation graphical display element's primitive within a merged virtual three-dimensional environment, a three-dimensional image of one or more participants, and a three-dimensional location of one or more participant's primitives within a merged virtual three-dimensional environment. For example, in an embodiment, an augmented presentation management system may access the three-dimensional image of a presenter and/or a second presenter, as captured by a presenter's three-dimensional camera array, the three-dimensional image of an observer as captured by an observer's three-dimensional camera array, and/or the three-dimensional image of a second presenter, as captured by a second presenter's three-dimensional camera array. As another example, in a further aspect of an embodiment, an augmented presentation management system may access a merged virtual three-dimensional environment, and the positions of one or more of the following primitives within that merged virtual three-dimensional environment: a presenter's primitive, an observer's primitive, a second presenter's primitive, and a virtual, shared presentation graphical display element primitive.

At block 1208, in an embodiment, the location of the merged virtual user interface plane primitive within the merged virtual three-dimensional environment may be associated with the location of each participant's display device in physical reality. In an embodiment, the three-dimensional mapping module may associate the location of the merged virtual user interface plane primitive within the merged virtual three-dimensional environment with the location of each participant's display device in physical reality. For example, with reference to the embodiment described in FIG. 7, the three-dimensional mapping module may associate the location of the merged virtual user interface plane primitive 708 within the virtual three-dimensional environment 700 with the location of the presenter's display device and the observer's display device in physical reality.

At block 1210, in an embodiment, a manipulated virtual, shared presentation graphical display element may be displayed on each participant's digital display in a location that reflects the location of the manipulated virtual, shared presentation graphical display element's primitive within the merged virtual user interface plane's primitive. In an embodiment, the augmented presentation display module may display a manipulated virtual, shared presentation graphical display element on each participant's digital display such that its location within each participant's digital display reflects the location of the manipulated virtual, shared presentation graphical display element's primitive within the merged virtual user interface plane's primitive. For example, with reference to the embodiment described with reference to FIG. 8, the augmented presentation display module may display the enlarged "cash paid out" pie chart virtual, shared presentation graphical display element on the digital display of the presenter's augmented presentation display device 112 such that the enlarged "cash paid out" pie chart virtual, shared presentation graphical display element's location in the middle of the digital display of the presenter's augmented presentation display device 112 in physical reality reflects the location of the enlarged "cash paid out" pie chart virtual, shared presentation graphical display element's primitive in the middle of the merged virtual user interface plane's primitive within the merged virtual three-dimensional environment. As another example, with reference to the embodiment described with reference to FIG. 9, the augmented presentation display module may display the enlarged "cash paid out" pie chart virtual, shared presentation graphical display element on the digital display of the observer's augmented presentation display device 114 such that the enlarged "cash paid out" pie chart virtual, shared presentation graphical display element's location in the middle of the digital display of the presenter's augmented presentation display device 114 in physical reality reflects the location of the enlarged "cash paid out" pie chart virtual, shared presentation graphical display element's primitive in the middle of the merged virtual user interface plane's primitive within the merged virtual three-dimensional environment.

At block 1212, a three-dimensional image of one or more presenters may be displayed on the observer's digital display in physical reality in a location that reflects the location of one or more presenters' primitives with respect to the merged virtual user interface plane's primitive in the merged virtual three-dimensional environment. In an embodiment, the augmented presentation display module may display a three-dimensional image of one or more presenters on the observer's digital display in physical reality in a location that reflects the location of one or more presenters' primitives with respect to the merged virtual user interface plane's primitive in the merged virtual three-dimensional environment. For example, with reference to the embodiment described in FIG. 9, the augmented presentation display module may display a three-dimensional image of a presenter 904 on the digital display device of the observer's augmented presentation display device 114 in physical reality in a location that reflects the location of the presenter's primitive with respect to the merged virtual user interface plane's primitive in the merged virtual three-dimensional environment. In another example, with reference to that embodiment, the augmented presentation display module may display a three-dimensional image of a second presenter 802 on the digital display device of the observer's augmented presentation display device 114 in physical reality in a location that reflects the location of the second presenter's primitive with respect to the merged virtual user interface plane's primitive in the merged virtual three-dimensional environment.

These customizations are only a few examples of a wide range of potential customizations, which can include any specification as to the orientation of merged head mounted display device user interface elements within the merged user interface, and correlation between the display of merged head mounted display device user interface elements with base user interface elements.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an augmented presentation management system comprising:
   a processor receiving a first three-dimensional image of a first presenter including data of a first presenter location relative to a first presentation graphical display element displayed on a first presenter digital display device captured via a first three-dimensional camera;
   the processor receiving a three-dimensional image of a second presenter including data of a second presenter location relative to a second presenter digital display device captured via a second three-dimensional camera;
   the processor executing code instructions of the augmented presentation management system to:
      generate in a three-dimensional virtual environment a first presenter primitive based on the received first three-dimensional image of the first presenter and a second presenter primitive based on the received three-dimensional image of the second presenter;
      generate a virtual, shared presentation graphical display element primitive located in the three-dimensional virtual environment according to the first presenter location relative to the presentation graphical display element;
      automatically generate in the three-dimensional virtual environment a digital display device primitive plane having a location in the three-dimensional virtual environment such that the virtual, shared presentation graphical display element primitive is within the digital display device primitive plane, and the virtual, shared presentation graphical display element primitive is viewable from the location of the first presenter primitive and the second presenter primitive; and
      instruct a digital display device to display the first three-dimensional image of the first presenter as captured by the first three-dimensional camera interacting with a displayed virtual, shared presentation graphical display element according to a perspective view of the first presenter primitive and the virtual, shared presentation graphical display element primitive from the location of the digital display device primitive plane in the three-dimensional virtual environment.

2. The information handling system operating the augmented presentation management system of claim 1, wherein the virtual, shared presentation graphical display element is a copy of an application window displayed on the presenter digital display device.

3. The information handling system operating the augmented presentation management system of claim 1 further comprising:

the augmented presentation management system to orient the digital display primitive plane in the three-dimensional virtual environment such that the virtual, shared presentation graphical display element primitive has a position outside the borders of the first presenter primitive as viewed from the perspective of the digital display primitive plane.

4. The information handling system operating the augmented presentation management system of claim 1, further comprising:

the three-dimensional image of the second presenter including data of the second presenter location relative to a second presentation graphical display element on the second presenter digital display device;

wherein the second presentation graphical display element is similar to the virtual, shared presentation graphical display element; and the processor instructing the digital display to display the virtual, shared presentation graphical display element according to a perspective view of the second presenter primitive and the virtual, shared presentation graphical display element primitive from the location of the digital display device primitive plane in the three-dimensional virtual environment.

5. The information handling system operating the augmented presentation management system of claim 4, further comprising:

the augmented presentation management system receiving data from a second user input device intersecting with a virtual user-interface plane and the virtual, shared presentation graphical display element to allow the second presenter to manipulate the virtual, shared presentation graphical display element on the second presenter's digital display device.

6. The information handling system operating the augmented presentation management system of claim 4, wherein the display device is a remote display device viewed by an observer of interaction by the first three-dimensional image of the first presenter and the first three-dimensional image of the second presenter with the virtual, shared presentation graphical display element each viewable in three dimensional perspective view.

7. The information handling system operating the augmented presentation management system of claim 1 further comprising:

the processor receiving a second three-dimensional image of the first presenter at a later time wherein the first presenter has moved, including data of a first presenter adjusted location with respect to the presentation graphical display element; and the augmented presentation management system placing the first presenter primitive within the three-dimensional virtual environment at an updated first presenter location based on the data of the first presenter adjusted location.

8. The information handling system operating the augmented presentation management system of claim 1, wherein data received from a first user input device allows the first presenter to use the user input device to manipulate the presentation graphical display element in such a way as to alter the position or orientation of the virtual, shared presentation graphical display element primitive within the three-dimensional virtual environment.

9. A computer implemented method for displaying a virtual, shared presentation graphical display element comprising:

executing instructions, via a processor, of an augmented presentation management system for displaying a virtual, shared presentation graphical display element;

receiving via a first three-dimensional camera a first three-dimensional image of a first presenter including data of a presenter location relative to a presentation graphical display element displayed on a first presenter digital display device captured via a three-dimensional camera, and generating in a three-dimensional virtual environment a first presenter primitive based on the received first three-dimensional image of the first presenter;

receiving a three-dimensional image of a second presenter including data of a second presenter location relative to a second presenter digital display device captured via a second three-dimensional camera, and generating a second presenter primitive based on the received three-dimensional image of the second presenter;

generating a virtual, shared presentation graphical display element primitive located in the three-dimensional virtual environment according to the presenter location relative to the presentation graphical display element;

automatically generating in the three-dimensional virtual environment a virtual user-interface plane primitive having a location in the three-dimensional virtual environment such that the virtual, shared presentation graphical display element primitive is within the virtual user-interface plane primitive, and the virtual, shared presentation graphical display element primitive is viewable from the location of the first presenter primitive and the second presenter primitive;

displaying via a virtual user-interface plane the first three-dimensional image of the first presenter as captured by the first three-dimensional camera interacting with a displayed virtual, shared presentation graphical display element according to a perspective view of the first presenter primitive and the virtual, shared presentation graphical display element primitive from the location of the virtual user-interface plane primitive in the three-dimensional virtual environment.

10. The computer implemented method for displaying a virtual, shared presentation graphical display element of claim 9, wherein the virtual, shared presentation graphical display element is a copy of an application window displayed on the first presenter digital display device.

11. The computer implemented method for displaying a virtual, shared presentation graphical display element of claim 9 further comprising:

orienting the virtual user-interface plane primitive in the three-dimensional virtual environment such that the virtual, shared presentation graphical display element primitive has a position outside the borders of the first presenter primitive as viewed from the perspective of the virtual user-interface plane primitive.

12. The computer implemented method for displaying a virtual, shared presentation graphical display element of claim 9, further comprising:
  the three-dimensional image of the second presenter including data of the second presenter location relative to the displayed virtual, shared presentation graphical display element on the virtual user-interface plane;
  locating the second presenter primitive with respect to the location of the virtual, shared presentation graphical display element primitive within the three-dimensional virtual environment according to the second presenter location relative to the displayed virtual, shared presentation graphical display element; and
  displaying via the first presenter digital display the virtual, shared presentation graphical display element and the three-dimensional image of the second presenter according to a perspective view of the second presenter primitive and the virtual, shared presentation graphical display element primitive from the location of the virtual user-interface plane primitive in the three-dimensional virtual environment.

13. The computer implemented method for displaying a virtual, shared presentation graphical display element of claim 12, further comprising:
  the augmented presentation management system receiving data from a second user input device intersecting with the virtual user-interface plane and the virtual, shared presentation graphical display element to allow the second presenter to manipulate the virtual, shared presentation graphical display element.

14. The computer implemented method for displaying a virtual, shared presentation graphical display element of claim 9 further comprising:
  receiving a second three-dimensional image of the first presenter at a later time wherein the first presenter has moved, including data of a first presenter adjusted location with respect to the presentation graphical display element; and
  the augmented presentation management system placing the first presenter primitive within the three-dimensional virtual environment at an updated first presenter location based on the data of the first presenter adjusted location.

15. The computer implemented method for displaying a virtual, shared presentation graphical display element of claim 9, wherein the presentation graphical display element is manipulated via the input device in such a way as to alter the position or orientation of the virtual, shared presentation graphical display element primitive within the three-dimensional virtual environment.

16. An information handling system operating an augmented presentation management system comprising:
  a processor receiving a first three-dimensional image of a first presenter including data of a presenter location relative to a presentation graphical display element displayed on a first presenter digital display device captured via a first three-dimensional camera;
  the processor receiving a three-dimensional image of a second presenter including data of a second presenter location relative to a second presenter digital display device captured via a second three-dimensional camera;
  the processor executing code instructions of the augmented presentation management system to:
    generate in a three-dimensional virtual environment a first presenter primitive based on the received first three-dimensional image of the first presenter, and a second presenter primitive based on the received three-dimensional image of the second presenter;
    generate a virtual, shared presentation graphical display element primitive located in the three-dimensional virtual environment according to the first presenter location relative to the presentation graphical display element;
    automatically generate in the three-dimensional virtual environment a digital display device primitive plane having a location in the three-dimensional virtual environment such that the virtual, shared presentation graphical display element primitive is within the digital display device primitive plane and the virtual, shared presentation graphical display element primitive is viewable from the location of the first presenter primitive and the second presenter primitive; and
    instruct a digital display device to display the first three-dimensional image of the first presenter as captured via the first three-dimensional camera interacting with a displayed virtual, shared presentation graphical display element according to a perspective view of the first presenter primitive and the virtual, shared presentation graphical display element primitive from the location of the digital display device primitive plane in the three-dimensional virtual environment;
    wherein the displayed virtual, shared presentation graphical display element is a copy of an application window displayed on the first presenter digital display device.

17. The information handling system operating the augmented presentation management system of claim 16 further comprising:
  the augmented presentation management system to orient the digital display primitive plane in the three-dimensional virtual environment such that the virtual, shared presentation graphical display element primitive has a position outside the borders of the first presenter primitive, as viewed from the perspective of the digital display primitive plane.

18. The information handling system operating the augmented presentation management system of claim 16, further comprising:
  the three-dimensional image of the second presenter including data of the second presenter location relative to a second presentation graphical display element on the second presenter digital display device;
  wherein the second presentation graphical display element is similar to the virtual, shared presentation graphical display element;
  the processor locating the second presenter primitive with respect to the location of the virtual, shared presentation graphical display element primitive within the three-dimensional virtual environment according to the second presenter location relative to the second presentation graphical display element; and
  the processor instructing the digital display to display the virtual, shared presentation graphical display element according to a perspective view of the second presenter primitive and the virtual, shared presentation graphical display element primitive from the location of the digital display device primitive plane in the three-dimensional virtual environment.

19. The information handling system operating the augmented presentation management system of claim 16 further comprising:

the processor receiving a second three-dimensional image of the first presenter at a later time wherein the first presenter has moved, including data of a first presenter adjusted location with respect to the presentation graphical display element; and the augmented presentation management system placing the first presenter primitive within the three-dimensional virtual environment at an updated first presenter location based on the data of the first presenter adjusted location.

20. The information handling system operating the augmented presentation management system of claim 16, wherein data received from a first user input device allows the first presenter to use the user input device to manipulate the presentation graphical display element to alter the position or orientation of the virtual, shared presentation graphical display element primitive within the three-dimensional virtual environment.

\* \* \* \* \*